(12) United States Patent
Kurokawa

(10) Patent No.: US 11,237,543 B2
(45) Date of Patent: Feb. 1, 2022

(54) CONTROL SYSTEM, CONTROL METHOD, AND CONTROL PROGRAM

(71) Applicant: OMRON Corporation, Kyoto (JP)

(72) Inventor: Yoichi Kurokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/642,373

(22) PCT Filed: Feb. 6, 2019

(86) PCT No.: PCT/JP2019/004284
§ 371 (c)(1),
(2) Date: Feb. 27, 2020

(87) PCT Pub. No.: WO2019/176386
PCT Pub. Date: Sep. 19, 2019

(65) Prior Publication Data
US 2021/0072730 A1     Mar. 11, 2021

(30) Foreign Application Priority Data

Mar. 12, 2018 (JP) .............................. JP2018-044127

(51) Int. Cl.
G05B 19/4155     (2006.01)
G06F 3/0484      (2013.01)
H04L 29/08       (2006.01)

(52) U.S. Cl.
CPC ....... *G05B 19/4155* (2013.01); *G06F 3/0484* (2013.01); *H04L 67/12* (2013.01); *G05B 2219/31368* (2013.01)

(58) Field of Classification Search
None
See application file for complete search history.

(56) References Cited

U.S. PATENT DOCUMENTS 6,381,501 B1 * 4/2002 Takase ................. G05B 19/052
                                                        700/2
2008/0313228 A1 * 12/2008 Clark ................... G05B 19/058
(Continued)

FOREIGN PATENT DOCUMENTS

EP          2042961 A1     4/2009
JP       2005-174126 A     6/2005
(Continued)

OTHER PUBLICATIONS

English translation of the International Search Report("ISR") of PCT/JP2019/004284 dated Apr. 23, 2019.
(Continued)

*Primary Examiner* — Charles E Anya
(74) *Attorney, Agent, or Firm* — Metrolex IP Law Group, PLLC

(57) ABSTRACT

A control system includes a control device. The control device has a first communication unit and a second communication unit respectively connected to distinct networks distinct from each other, and a timer that manages a time-indicative value. The control device collects first communication data transmitted and/or received by the first communication unit, associates the collected first communication data with a value indicating a time point at which this communication data is transmitted and/or received, and stores the resulting first communication data. The control device collects second communication data transmitted and/or received by the second communication unit, associates the collected second communication data with a value indicating a time point at which this communication data is transmitted and/or received, and stores the resulting second communication data.

15 Claims, 14 Drawing Sheets

(56) References Cited

U.S. PATENT DOCUMENTS

| | | | |
|---|---|---|---|
| 2011/0026407 A1 | 2/2011 | Yamada et al. | |
| 2011/0153817 A1* | 6/2011 | Wright | G06F 11/3476 709/224 |
| 2012/0245712 A1* | 9/2012 | Mohring | G05B 19/4148 700/56 |
| 2013/0212420 A1 | 8/2013 | Lawson et al. | |
| 2017/0068229 A1 | 3/2017 | Yaoita et al. | |
| 2017/0302624 A1* | 10/2017 | Persson | H04L 12/4633 |

FOREIGN PATENT DOCUMENTS

| | | |
|---|---|---|
| JP | 2008-204166 A | 9/2008 |
| JP | 2011-035664 A | 2/2011 |
| JP | 2015-176370 A | 10/2015 |
| WO | 2011/005619 A1 | 1/2011 |
| WO | 2012/012723 A2 | 1/2012 |

OTHER PUBLICATIONS

Written Opinion("WO") of PCT/JP2019/004284 dated Apr. 23, 2019.
Office Action (JPOA) dated Oct. 12, 2021 in a basic Japanese patent application No. 2018-044127.
Extended European Search report ("EESR") dated Nov. 5, 2021 in counterpart European Application.

* cited by examiner

FIG.6

| | 360 | 361 | 362 | 363 | 364 | 365 | 366 |
|---|---|---|---|---|---|---|---|
| 150ca | 583130 | 2017/5/1 06:2:27.822700 | 192.168.25... | 192.168.25... | HTTP | 336 | HTTP/1.1 200 OK(application/... |
| 150cb | 583131 | 2017/5/1 06:2:27.823300 | 192.168.25... | 192.168.25... | TCP | 76 | 80→58081[ACK]seq=11393... |
| 150cc | 583132 | 2017/5/1 06:2:27.824010 | 192.168.25... | 192.168.25... | TCP | 76 | 396[TCP segment of are assembled... |
| | ...... | ...... | ...... | ...... | ...... | ...... | ...... |

| 360 | 361 | 362 | 367 | 364 | 365 | 366 36b |
|---|---|---|---|---|---|---|
| 694138 | 2017/5/1 06:2:27.821986 | OmronTat_8... 02:00:0a_8... | Broadcast | ECAT | 76 | 'FPWR': Len:2, Adp 0x3, Ado 0x120, |
| 694139 | 2017/5/1 06:2:27.822203 | OmronTat_8... 02:00:0a_8... | Broadcast | ECAT | 76 | 'FPWR': Len:2, Adp 0x3, Ado 0x120, |
| 694140 | 2017/5/1 06:2:27.822734 | OmronTat_8... 02:00:0a_8... | Broadcast | ECAT | 336 | 2 Cmds, 'LRD': len 24, 'FPRD' |
| 694141 | 2017/5/1 06:2:27.822951 | OmronTat_8... 02:00:0a_8... | Broadcast | ECAT | 336 | 2 Cmds, 'LRD': len 24, 'FPRD' |
| 694142 | 2017/5/1 06:2:27.823000 | OmronTat_8... 02:00:0a_8... | Broadcast | ECAT | 76 | 'FPWR': Len:2, Adp 0x17, Ado 0x120, |
| 694143 | 2017/5/1 06:2:27.823217 | OmronTat_8... 02:00:0a_8... | Broadcast | ECAT | 76 | 'FPWR': Len:2, Adp 0x17, Ado 0x120, |
| 694144 | 2017/5/1 06:2:27.823733 | OmronTat_8... 02:00:0a_8... | Broadcast | ECAT | 336 | 2 Cmds, 'LRD': len 24, 'FPRD' |
| 694145 | 2017/5/1 06:2:27.823950 | OmronTat_8... 02:00:0a_8... | Broadcast | ECAT | 336 | 2 Cmds, 'LRD': len 24, 'FPRD' |
| 694146 | 2017/5/1 06:2:27.823999 | OmronTat_8... 02:00:0a_8... | Broadcast | ECAT | 76 | 'FPWR': Len:2, Adp 0x26, Ado 0x120, |
| 694147 | 2017/5/1 06:2:27.824216 | OmronTat_8... 02:00:0a_8... | Broadcast | ECAT | 76 | 'FPWR': Len:2, Adp 0x26, Ado 0x120, |
| 694148 | 2017/5/1 06:2:27.824242 | OmronTat_8... 02:00:0a_8... | Broadcast | ECAT | 76 | 2 Cmds, 'FPWR': len 16, 'FPWR' |
| 694149 | 2017/5/1 06:2:27.824459 | OmronTat_8... 02:00:0a_8... | Broadcast | ECAT | 76 | 2 Cmds, 'FPWR': len 16, 'FPWR' |
| ... | ... | ... | ... | ... | ... | ... |

| | 360 | 361 | 362 | 363 | 364 | 365 | 366 |
|---|---|---|---|---|---|---|---|
| 150ca | 583130 | 2017/5/1 06:2:27.822700 | 192.168.25... | 192.168.25... | HTTP | 336 | HTTP/1.1 200 OK(application/··· |
| 150cb | 583131 | 2017/5/1 06:2:27.823300 | 192.168.25... | 192.168.25... | TCP | 76 | 80→58081[ACK]seq=11393 |
| 150cc | 583132 | 2017/5/1 06:2:27.824010 | 192.168.25... | 192.168.25... | TCP | 76 | 396[TCP segment of are assembled··· |
| | ... | ... | ... | ... | ... | ... | ... |
| 160ca | 694138 | 2017/5/1 06:2:27.821986 | OmronTat_8... | Broadcast | ECAT | 76 | 'FPWR': Len:2, Adp 0x3, Ado 0x120, Wc 0 |
| | 694139 | 2017/5/1 06:2:27.822203 | 02:00:0a_8... | Broadcast | ECAT | 76 | 'FPWR': Len:2, Adp 0x3, Ado 0x120, Wc 0 |
| | 694140 | 2017/5/1 06:2:27.822734 | OmronTat_8... | Broadcast | ECAT | 336 | 2 Cmds, 'LRD': len 24, 'FPRD': len 256 |
| | 694141 | 2017/5/1 06:2:27.822951 | 02:00:0a_8... | Broadcast | ECAT | 336 | 2 Cmds, 'LRD': len 24, 'FPRD': len 256 |
| 160cb | 694142 | 2017/5/1 06:2:27.823000 | OmronTat_8... | Broadcast | ECAT | 76 | 'FPWR': Len:2, Adp 0x17, Ado 0x120, Wc 0 |
| | 694143 | 2017/5/1 06:2:27.823217 | 02:00:0a_8... | Broadcast | ECAT | 76 | 'FPWR': Len:2, Adp 0x17, Ado 0x120, Wc 0 |
| | 694144 | 2017/5/1 06:2:27.823733 | OmronTat_8... | Broadcast | ECAT | 336 | 2 Cmds, 'LRD': len 24, 'FPRD': len 256 |
| | 694145 | 2017/5/1 06:2:27.823950 | 02:00:0a_8... | Broadcast | ECAT | 336 | 2 Cmds, 'LRD': len 24, 'FPRD': len 256 |
| 160cc | 694146 | 2017/5/1 06:2:27.823999 | OmronTat_8... | Broadcast | ECAT | 76 | 'FPWR': Len:2, Adp 0x26, Ado 0x120, Wc 0 |
| | 694147 | 2017/5/1 06:2:27.824216 | 02:00:0a_8... | Broadcast | ECAT | 76 | 'FPWR': Len:2, Adp 0x26, Ado 0x120, Wc 0 |
| | 694148 | 2017/5/1 06:2:27.824242 | OmronTat_8... | Broadcast | ECAT | 76 | 2 Cmds, 'FPWR': len 16, 'FPWR': len 1 |
| | 694149 | 2017/5/1 06:2:27.824459 | 02:00:0a_8... | Broadcast | ECAT | 76 | 2 Cmds, 'FPWR': len 16, 'FPWR': len 1 |
| | ... | ... | ... | ... | ... | ... | ... |

CONTROL SYSTEM, CONTROL METHOD, AND CONTROL PROGRAM

TECHNICAL FIELD

This disclosure relates to technologies for collecting communication data using control systems.

BACKGROUND ART

Manufacturing sites using factory automation (FA) techniques have introduced and are using industrial control devices, for example, programmable logic control device (PLC) and robot controllers. The manufacturing steps can be automated by using such control devices to control external devices including different industrial drivers operable to perform network-mediated communications. For example, Japanese Patent Laying-Open No. 2011-35664 (PTL 1) describes a technology relevant to such control devices, which is a facility system using a control device equipped with protocol functions to collect data, for example, capture communication data including frames.

CITATION LIST

Patent Literature

PTL 1: Japanese Patent Laying-Open No. 2011-35664

SUMMARY OF INVENTION

Technical Problem

In order to collect information used to analyze communication difficulties/errors if they occur in network-mediated communications, the known industrial control devices collect communication data solely from one field network connected to the communication units of these control devices. The control devices, however, may transmit and/or receive communication data through two or more distinct networks each having a control unit, in which case communication data, if collected from one field network alone, may be insufficient to fully analyze factors causing the communication errors to be dealt with.

This disclosure is directed to solving such outstanding issues. In one aspect, this disclosure provides a technology that facilitates the collection of communication data needed to identify factors causing any communication problems that involve more than one network.

Solution to Problem

In an example of the technology disclosed herein, a control system including a control device is provided. The control device includes: a first communication unit connected to a first network; a second communication unit connected to a second network distinct from the first network; a timer that manages a value indicative of time; a first collecting function; and a second collecting function. The first collecting function, when the first communication unit transmits and/or receives communication data, collects the communication data transmitted and/or received by the first communication unit as first communication data and stores in a storage the first communication data associated with a value indicating a time point at which the first communication data is transmitted and/or received The second collecting function, when the second communication unit transmits and/or receives communication data, collects the communication data transmitted and/or received by the second communication unit as second communication data and stores in the storage the second communication data associated with a value indicating a time point at which the second communication data is transmitted and/or received.

The control system thus characterized can facilitate the collection of communication data needed to identify factors causing any communication errors that involve more than one network.

In an example of the technology disclosed herein, the control system further includes a sorting unit that rearranges the first communication data associated with the value indicating the time point and the second communication data associated with the value indicating the time point in accordance with the values indicating the time point.

The control system thus characterized may allow a relationship to be clearly defined between different pieces of communication data needed to identify the error-causing factors.

In an example of the technology disclosed herein, the control system further includes a support device that acquires, from the control device, the first communication data associated with the value indicating the time point and the second communication data associated with the value indicating the time point, and the support device includes the sorting unit.

The support device thus characterized may be allowed to present, to a user, different pieces of communication data needed to identify the error-causing factors after they are chronologically rearranged.

In an example of the technology disclosed herein, the support device includes a display unit that displays an image containing a set of the communication data rearranged by the sorting unit.

The support device thus characterized may be allowed to display, to a user, pieces of communication data needed to identify the error-causing factors after they are chronologically rearranged.

In an example of the technology disclosed herein, the display unit displays in a different manner a piece of communication data from among the set of the communication data rearranged by the sorting unit that satisfies a condition specified by a user.

The support device thus characterized may be allowed to output, to the display unit, only a particular piece(s) of communication data needed to analyze the error-causing factors.

In an example of the technology disclosed herein, the first collecting function and the second collecting function collect the communication data that satisfies a predefined condition alone.

The control device thus characterized may be allowed to selectively collect a particular piece(s) of communication data needed to analyze the error-causing factors.

In an example of the technology disclosed herein, a control method is provided that is for use in a control device configured to control a control target, the control device including: a first communication unit connected to a first network; and a second communication unit connected to a second network distinct from the first network. The control method includes steps of: managing a value indicative of time; when the first communication unit transmits and/or receives communication data, collecting the communication data transmitted and/or received by the first communication unit as first communication data and storing in a storage the first communication data associated with a value indicating a time point at which the first communication data is transmitted and/or received; and when the second communication unit transmits and/or receives communication data, collecting the communication data transmitted and/or received by the second communication unit as second communication data and storing in the storage the second communication data associated with a value indicating a time point at which the second communication data is transmitted and/or received.

The control method thus characterized can facilitate the collection of communication data needed to identify factors causing any communication errors that involve more than one network.

In an example of the technology disclosed herein, a control program is provided that is for use in a control device configured to control a control target, the control device including: a first communication unit connected to a first network; and a second communication unit connected to a second network distinct from the first network. The control program causes the control device to perform the steps of: updating a value indicative of time; when the first communication unit transmits and/or receives communication data, collecting the communication data transmitted and/or received by the first communication unit as first communication data and storing in a storage the first communication data associated with a value indicating a time point at which the first communication data is transmitted and/or received; and when the second communication unit transmits and/or receives communication data, collecting the communication data transmitted and/or received by the second communication unit as second communication data and storing in the storage the second communication data associated with a value indicating a time point at which the second communication data is transmitted and/or received.

The control program thus characterized can facilitate the collection of communication data needed to identify factors causing any communication errors that involve more than one network.

Advantageous Effects of Invention

In an aspect of the technology disclosed herein, the filtering condition can be freely changed in accordance with instructions included in the user program.

BRIEF DESCRIPTION OF DRAWINGS

FIG. 6 is a diagram that illustrates a specific example of a first communication recording list 36a according to embodiments.

FIG. 7 is a diagram that illustrates a specific example of a second communication recording list 36b according to embodiments.

FIG. 8 is a diagram that illustrates a first consolidated communication recording list 36c according to embodiments in which first communication recording list 36a and second communication recording list 36b are merged with each other.

DESCRIPTION OF EMBODIMENTS

Embodiments of the technology disclosed herein are hereinafter described referring to the accompanying drawings. In the description below, like components and technical or structural features are illustrated with the same reference signs. Also, they are referred to likewise and have similar functions. Such components and technical or structural features, therefore, will not be repeatedly described in detail.

A. Example of Application

Figure 1:
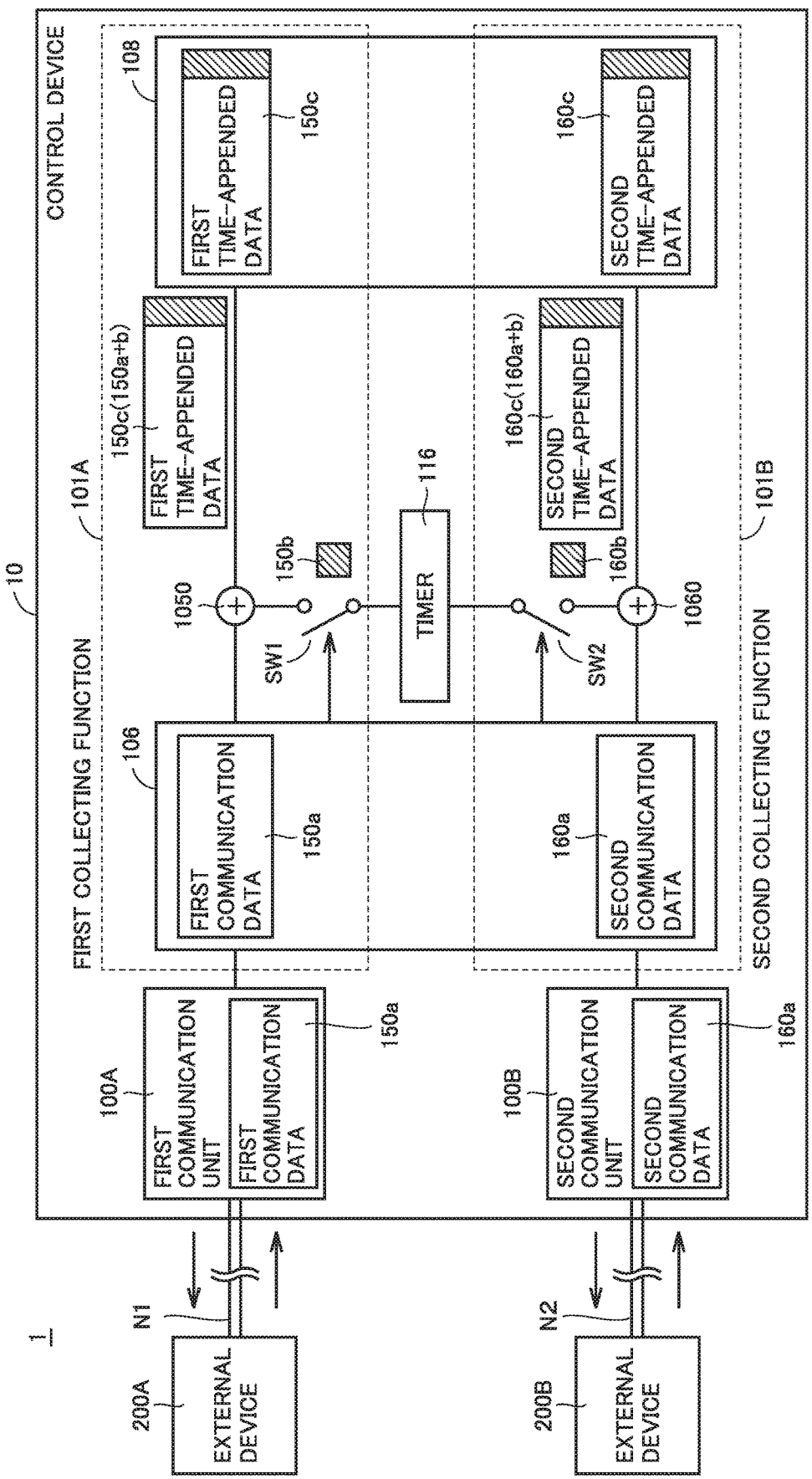
FIG. 1 is a block diagram illustrating a structural example of an FA system 1 according to embodiments.

An example of application of the technology disclosed herein is described below referring to FIG. 1. FIG. 1 is a block diagram illustrating a structural example of an FA system 1 according to embodiments.

FA system 1 is a control system that controls a target object, for example, facility or apparatus, to automate manufacturing steps. FA system 1 includes a control device 10 (hereinafter, may be referred to as "controller") and external devices; an external device 200A, and an external device 200B.

External device 200A is connected to a upper-layer network N1, and transmits and receives communication data to and from a first communication unit (hereinafter, may be referred to as "upper-layer network controller") 100A of control device 10. External device 200A includes a server, including, for example, a database system and a manufacturing execution system (MES). The manufacturing execution system obtains information from a control target; apparatus or facility for manufacture, to monitor and manage the whole production process. This system can also handle other pieces of information regarding, for example, placed order, product quality, and shipment.

The external device 200B is connected to a lower-layer network; a field network N2, and transmits and receives communication data to and from a second communication unit (hereinafter, may be referred to as "field network controller") 100B of control device 10. External device 200B includes devices that are used during manufacturing steps, for example, an image sensor with a camera used to photograph a workpiece transported during the manufacturing steps, and a remote I/O device that transmits and receives communication data to and from an arm robot used to, for example, mechanically process the workpiece.

Upper-layer network N1 may be the EtherNet/IP (registered trademark), which is an industrial network protocol based on a typical network protocol EtherNET (registered trademark). Field network N2 may be the EtherCAT (registered trademark) which is an industrial network protocol typically used.

Control device 10 includes a first communication unit 100A, a second communication unit 100B, a main memory 106, a timer 116, a first switch SW1, a second switch SW2, a first adder 1050, a second adder 1060, and a storage 108.

When first communication unit 100A connected to upper-layer network N1 receives first communication data 150a from external device 200A, first communication data 150a received by this communication unit is stored in main memory 106. When first communication data 150a received by first communication unit 100A is collected (captured) in main memory 106, an instruction signal is outputted to first switch SW1. First switch SW1 is interposed between timer 116 and first adder 1050. First switch SW1 shifts from OFF (open) to ON (closed) in response to the inputted instruction signal. Then, timer 116 and first adder 1050 are electrically interconnected.

Timer 116 is a time management device that counts time and outputs a value indicative of the counted time. The value indicative of time may be, for example, a count value cyclically updated at predetermined intervals.

First adder 1050 adds a first time value 150b; time-indicative value outputted from timer 116, to first communication data 150a stored in main memory 106. When first switch SW1 shifts to ON (closed), the time-indicative value outputted from timer 116 is inputted to first adder 1050, and first time value 150b is associated with first communication data 150a stored in main memory 106. Then, a first time-appended data 150c, which is the communication data associated with first time value 150b, is stored in storage 108.

Thus, when first communication data 150a is received by first communication unit 100A, control device 10 collects this first communication data 150a into main memory 106. Control device 10 has a first collecting function 101A. First collecting function 101A associates first communication data 150a with first time value 150b indicating a time point at which first communication data 150a is received, and then stores resulting first communication data 150a in storage 108.

When second communication unit 100B connected to field network N2 transmits second communication data 160a to external device 200B, second communication data 160a to be transmitted by this communication unit is stored in main memory 106. When second communication data 160a to be transmitted by second communication unit 100B is collected (captured) in main memory 106, an instruction signal is outputted to second switch SW2. Second switch SW2 is interposed between timer 116 and second adder 1060. Second switch SW2 shifts from OFF (open) to ON (closed) in response to the inputted instruction signal. Then, timer 116 and second adder 1060 are electrically interconnected.

Second adder 1060 adds a second time value 160b; time-indicative value outputted from timer 116, to second communication data 160a stored in main memory 106. When second switch SW2 shifts to ON (closed), the time-indicative value outputted from timer 116 is inputted to second adder 1060, and second time value 160b is associated with second communication data 160a stored in main memory 106. Then, a second time-appended data 160c, which is the communication data associated with second time value 160b, is stored in storage 108.

In the description below, first time-appended data 150c and second time-appended data 160c may be collectively referred to as "time-appended data".

Thus, when second communication data 160a is to be transmitted by second communication unit 100B, control device 10 collects this second communication data 160a into main memory 106. Control device 10 has a second collecting function 101B. Second collecting function 101B associates second communication data 160a with second time value 160b indicating a time point at which second communication data 160a is transmitted, and then stores resulting second communication data 160a in storage 108.

First communication data 150a and second communication data 160a are pieces of communication data transmitted/received through different networks distinct from each other. Specifically, they are pieces of communication data transmitted and/or received, by being mediated by control device 10, when information of settings suitable for a target workpiece is transmitted from external device 200A of upper-layer network N1 (for example, MES server 200a) to external device 200B of field network N2 (for example, image sensor 200d).

External device 200A transmits first communication data 150a containing the information of settings to control device 10 based on the protocol of upper-layer network N1 (for example, EtherNet/IP). Control device 10 transmits second communication data 160a containing the information of settings to external device 200B (for example, image sensor 200d) based on the protocol of field network N2 (for example, EtherCAT).

Control device 10 associates time-indicative values outputted from one timer 116 with relevant pieces of communication data transmitted/received through different networks, and then stores the resulting pieces of communication data in storage 108. This can facilitate the collection of communication data transmitted and/or received through different networks distinct from each other and needed to identify factors causing any communication difficulties/errors.

In the example described above, first time value 150b; a time value appended to first communication data 150a received by first communication unit 100A, indicates a time point earlier than that of second time value 160b; a time value appended to second communication data 160a to be transmitted by second communication unit 100B.

In the description above, first communication unit 100A associates first time value 150b with first communication data 150a received from external device 200A and stores resulting first communication data 150a in storage 108. Further, second communication unit 100B associates second time value 160b with second communication data 160a to be transmitted to external device 200B and stores resulting second communication data 160a. The transmission-reception relationship in data communication between first communication unit 100A and second communication unit 100B may be reversed. Specifically, the communication data received by second communication unit 100B from external device 200B may be associated with the time-indicative value and stored in storage 108, while the communication data to be transmitted by first communication unit 100A to external device 200A may be associated with the time-indicative value and stored. In this instance, the communication data received by second communication unit 100B and the communication data to be transmitted by first communication unit 100A that are collected in main memory 106 and then stored in storage 108 are pieces of communication data transmitted and/or received through different networks distinct from each other.

When, for example, information of coordinate positions of an arm robot moving in accordance with a target workpiece is transmitted from external device 200B of field network N2 (for example, remote I/O device 200f) to external device 200A of upper-layer network N1 (for example, database server 200b), the communication data outputted from external device 200B to control device 10 and the communication data to be transmitted from control device 10 to external device 200A are collected into main memory 106, associated with the time-indicative values, and then stored in storage 108.

In the example described above, the time-indicative value appended to the communication data received by first communication unit 100A indicates a time point later than that of the time-indicative value appended to the communication data to be transmitted by second communication unit 100B.

B. Hardware Components of Controller

Figure 2:
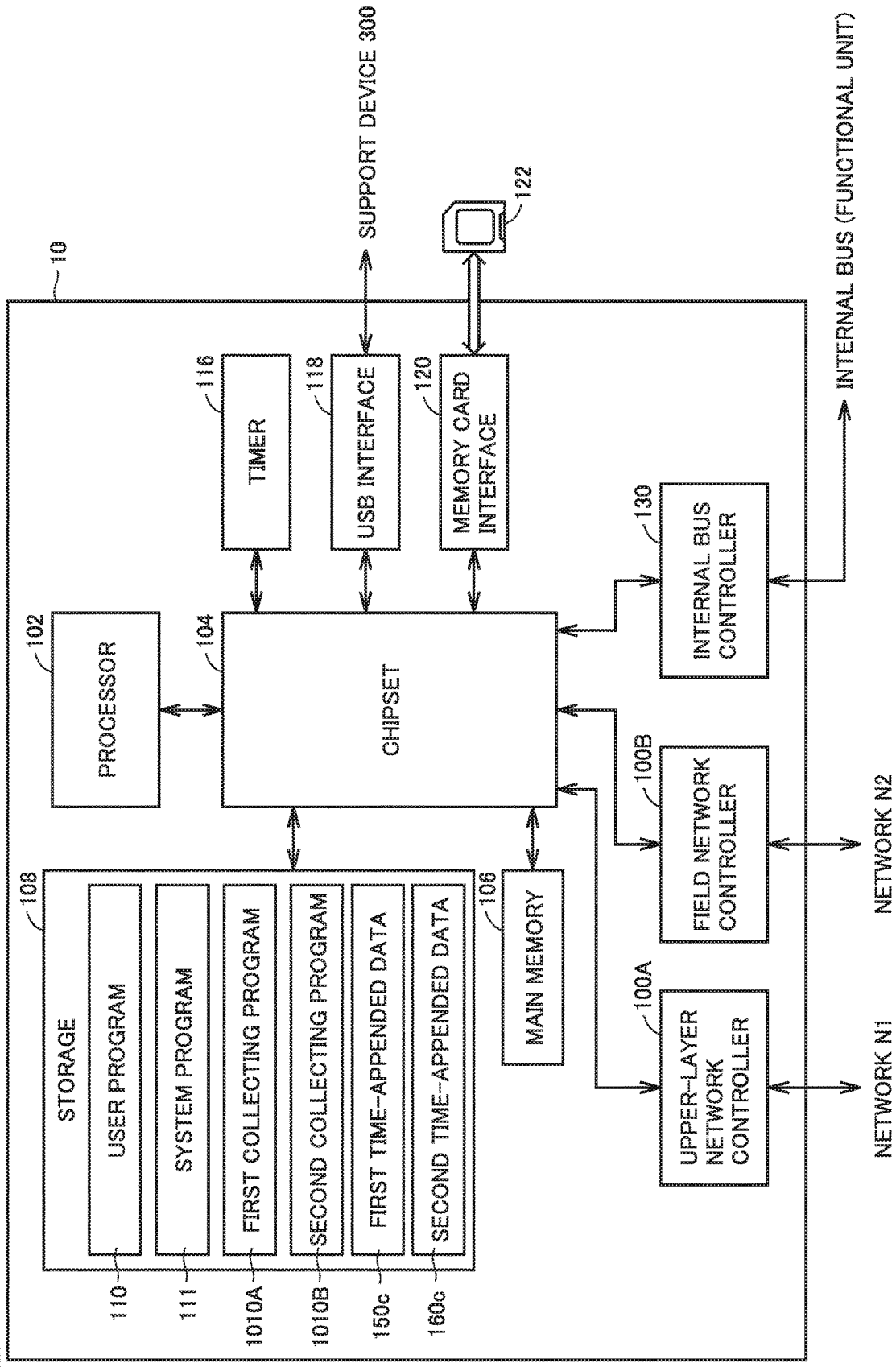
FIG. 2 is a block diagram that illustrates exemplified hardware components of a controller 10 according to embodiments.

FIG. 2 is a block diagram that illustrates exemplified hardware components of controller 10 according to embodiments. Referring to FIG. 2, controller 10 includes a processor 102, a chipset 104, a main memory 106, and storage 108. Controller 10 further includes a timer 116, a universal serial bus (USB) interface 118, and a memory card interface 120. Controller 10 further includes an internal bus controller 130, an upper-layer network controller 100A, and a field network controller 100B.

Structural elements of processor 102 include a central processing unit (CPU), a micro processing unit (MPU), and a graphics processing unit (GPU). Processor 102 may be a processor including a plurality of cores or may be a plurality of processors 102 that are disposed in arrangement. Controller 10 is thus provided with one or more processors 102 and/or a processor 102 having one or more cores.

Chipset 104 controls processor 102 and its peripheral elements to control all of the processes to be performed by controller 10. Chipset 104 includes first switch SW1, second switch SW2, first adder 1050, and second adder 1060.

Main memory 106 includes volatile storage devices, for example, dynamic random-access memory (DRAM) and static random-access memory (SRAM). Storage 108 includes a volatile storage device(s), for example, flash memory.

Processor 102 reads programs stored in storage 108, and then explores and executes the read programs on main memory 106 to allow appropriate control of any control target. In storage 108 is storable a system program 115 in addition to a user program 110 run to perform basic processes of control device 10. In storage 108 are also storable first collecting program 1010A loaded and run to perform first collecting function 101A and a second collecting program 1010B loaded and run to perform second collecting function 101B. In storage 108 are also storable first time-appended data 150c and second time-appended data 160c that are respectively stored as a result of first collecting function 101A and second collecting function 101B being performed. Typically, a plurality of pieces of first time-appended data 150c and of second time-appended data 160c are stored in the storage.

Specifically, processor 102 collects first communication data 150a into main memory 106, while storing, in storage 108, first time-appended data 150c in which first time value 150b is associated with first communication data 150a.

Further, processor 102 collects second communication data 160a into main memory 106, while storing, in storage 108, second time-appended data 160c in which second time value 160b is associated with second communication data 160a.

Timer 116 is a time management device that counts time relevant to controller 10 and outputs a value indicative of the counted time.

USB interface 118 mediates data communication to and from a USB-connected device(s). A USB interface 118 provides interconnection between the control device and a support device 300.

Memory card interface 120 is detachably mountable with memory card 122. Various pieces of data (for example, user program, trace data) can be written in and read from memory card 122.

Upper-layer network controller 100A is connected to upper-layer network N1 and is accordingly operable to mediate the transmission and reception of first communication data 150a to and from external device 200A, for example, a server.

Field network controller 100B is connected to field network N2 and is accordingly operable to mediate the transmission and reception of communication data to and from external device 200B, for example, an image sensor used during manufacturing steps.

Internal bus controller 130 is operable to mediate the transmission and reception of communication data to and from a functional unit mounted in controller 10.

In FIG. 2 is illustrated a structural example in which required processes are performed when processor 102 executes the programs. Instead, these processes to be performed may be implemented in part or in whole by the use of dedicated hardware circuits (for example, ASIC or FPGA).

C. Hardware Components of Support Device

Figure 3:
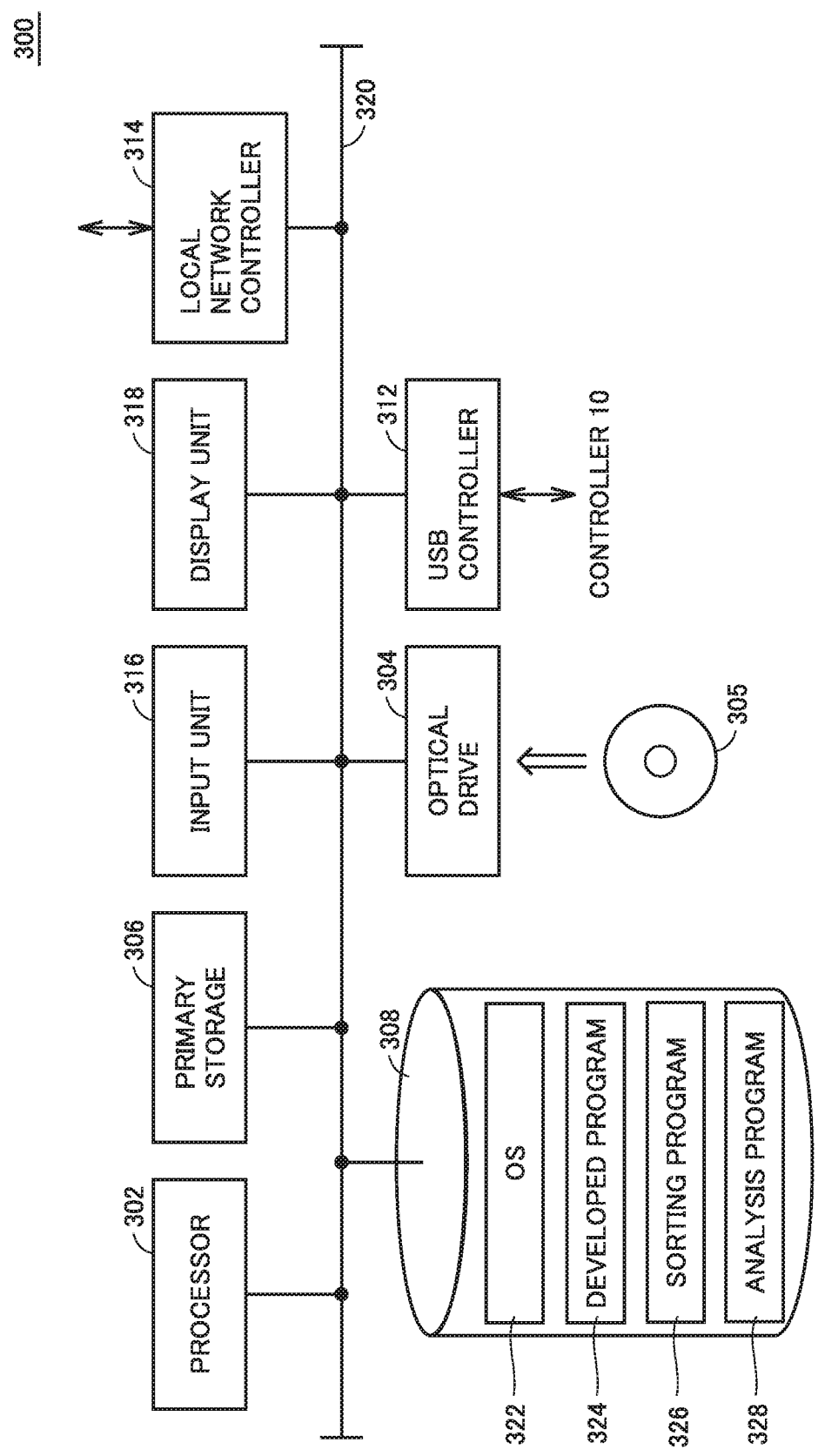
FIG. 3 is a block diagram illustrating exemplified hardware components of a support device 300 constituting FA system 1 according to embodiments.

FIG. 3 is a block diagram illustrating exemplified hardware components of support device 300 constituting FA system 1 according to embodiments. Support device 300 provides a designer with an environment where user program 110 can be developed and designed. Examples of support device 300 may include laptop computers, desktop computers, tablet terminals, and smart phones. The designer can design user program 110 on support device 300 and download this user program 110 into controller 10 through USB interface 112.

Referring to FIG. 3, support device 300 includes a processor 302, for example, CPU or MPU, an optical drive 304, a primary storage 306, a secondary storage 308, a USB controller 312, and a local network controller 314. Support device 300 further includes an input unit 316 and a display unit 318. These structural elements are interconnected through a bus 320. Processor 302 reads different programs stored in secondary storage 308 and then loads and executes the read programs in primary storage 306 to perform processes described later. Secondary storage 308 may include, for example, hard disk drive (HDD) and/or flash solid state drive (SSD). Secondary storage 308 further includes an operating system (OS) 322, a developed program 324, a sorting program 326, and an analysis program 328.

OS 322 provides a basic environment where processor 302 executes the programs including developed program 324 and analysis program 328.

Developed program 324 is a program developed to, for example, create a user program executed in support device 300, debug the created program, define the system configuration, and set parameters. This program may be typically supplied by a PLC manufacturer or a specialized software company.

Sorting program 326 is a program loaded and executed in primary storage 306 when processor 302 rearranges first time-appended data 150c and second time-appended data 160c in accordance with the time-indicative values. The process using this sorting program 326 will be described later.

Analysis program 328 is used to analyze factors causing data communication difficulties/errors in different networks distinct from each other based on communication data containing time-appended data collected from the networks.

Processor 302 loads analysis program 328 in primary storage 306 and executes the program in this storage. Processor 302 obtains first time-appended data 150c and second time-appended data 160c stored in storage 108 of controller 10. Processor 302 analyzes factors causing data communication errors that are occurring in the networks based on communication data containing the obtained time-appended data. Processor 302 may use, for example, the time-appended data to obtain the number of timeouts and/or the number of retries during the transmission and reception of communication data. Thus, processor 302 can easily identify the error-causing factors, for example, which one of the processes of external device 200A and external device 200B (e.g., downloading request) is responsible for the communication errors.

Support device 300 is equipped with optical drive 304. Programs that are non-transitorily stored in a computer-readable recording medium 305 (for example, optical recording medium such as digital versatile disc (DVD)) are read from this recording medium and installed in, for example, secondary storage 308.

The programs executed by support device 300 may be installed from computer-readable recording medium 305 or may be downloaded from a network server and installed in the storage. The functions provided by support device 300 according to embodiments disclosed herein may be feasible with some of modules provided by OS 322.

USB controller 312 controls the transmission and reception of data to and from controller 10 through USB connection.

Local network controller 314 controls the transmission and reception of data to and from other devices through any network.

Input unit 316 may include a keyboard and a mouse to receive inputs from a user. Display unit 318 includes a display, indicators and a printer to output, for example, processing results of processor 302.

In FIG. 3 is illustrated a structural example in which required functions are enabled when processor 302 executes the programs. Instead, such functions may be implemented in part or in whole by using dedicated hardware circuits (for example, ASIC or FPGA).

D. Specific Example of FA System

Figure 4:
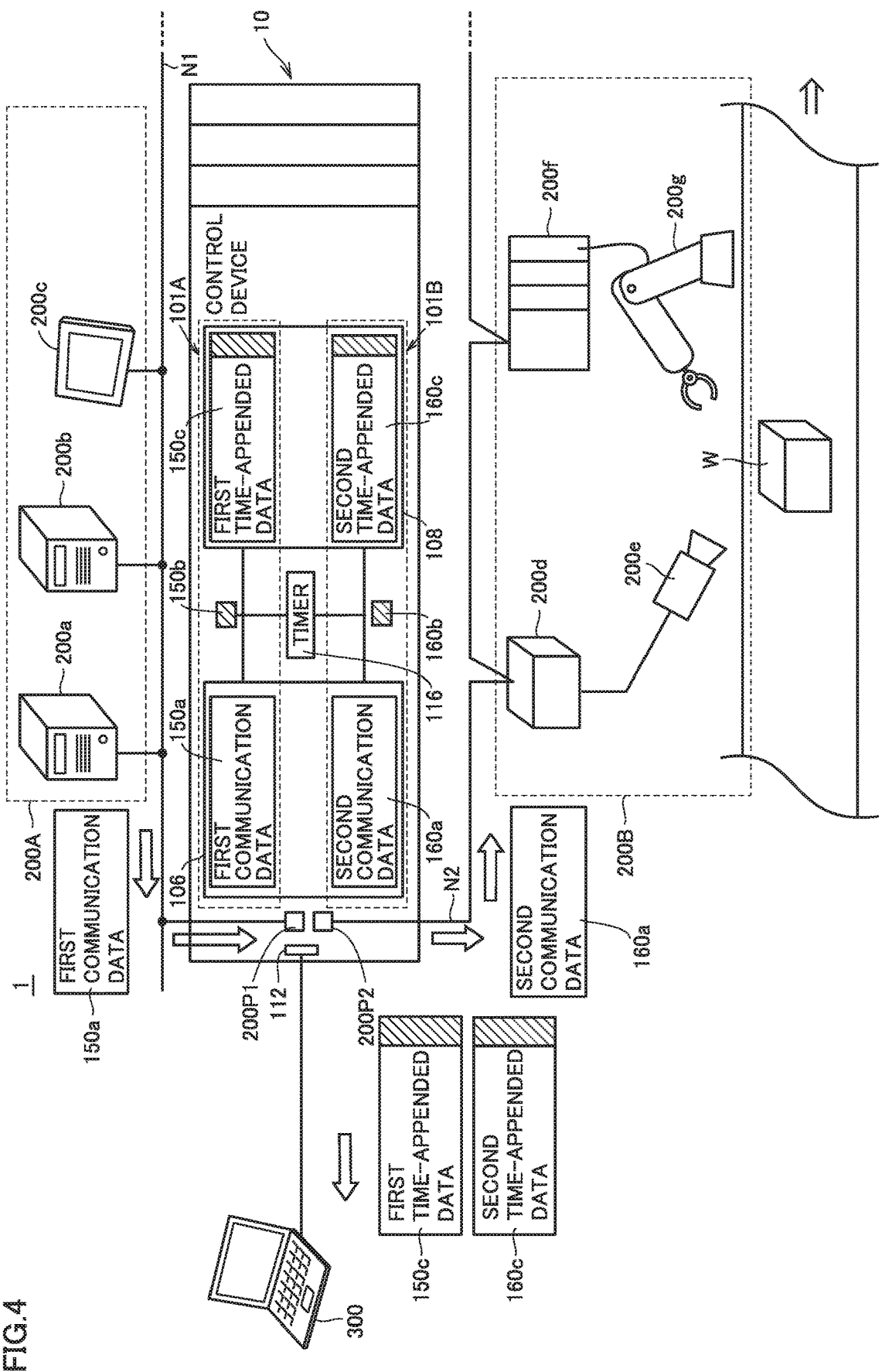
FIG. 4 is a diagram illustrating a specific example of FA system 1 according to embodiments.

A specific example of FA system 1 according to embodiments is hereinafter described. FIG. 4 is a diagram illustrating a specific example of FA system 1 according to embodiments.

FA system 1 includes controller 10, external devices 200A and 200B, and support device 300.

Controller 10 is connectable to a plurality of networks distinct from each other. In the example of FIG. 4, controller 10 has a plurality of communication ports including a communication port 200P1 and a communication port 200P2. Communication port 200P1 is connected to upper-layer network N1, while communication port 200P2 is connected to a lower-layer network; field network N2.

MES server 200a which is an external device, database server 200b, and display unit 200c are connected to upper-layer network N1. Examples of MES server 200a and database server 200b may include a manufacturing execution system and a database system. Instead of these devices, an apparatus that provides information-based services (for example, obtain various pieces of information from a control target and subject them to macroscopic or microscopic analysis) may be connected to upper-layer network N1. Display unit 200c may be a device that graphically displays, for example, a computation result obtained by controller 10 and that outputs a command(s) to controller 10 in answer to inputs from a user.

The devices connected to field network N2 includes image sensor 200d electrically connected to a camera 200e used to photograph a workpiece W, and remote I/O device 200f that transmits and receives communication data to and from an arm robot 200g holding workpiece W.

Processes using first collecting function 101A and second collecting function 101B of controller 10 are hereinafter described. In the example described below, MES server 200a transmits information of settings suitable for workpiece W is transmitted to image sensor 200d.

Controller 10 uses first collecting function 101A to store, in main memory 106, first communication data 150a relevant to the setting information received from MES server 200a.

Also, controller 10 uses first collecting function 101A to store, in storage 108, first time-appended data 150c in which first communication data 150a stored in main memory 106 is associated with first time value 150b outputted from timer 116.

Then, controller 10 uses second collecting function 101B to store, in main memory 106, second communication data 160a relevant to the setting information to be transmitted from controller 10.

Also, controller 10 uses second collecting function 101B to store, in storage 108, second time-appended data 160c in which second communication data 160a stored in main memory 106 is associated with second time value 160b outputted from timer 116. This can facilitate the collection of communication data needed to identify factors causing any communication errors that involve more than one network.

In response to a request to obtain data from support device 300, controller 10 transmits, to support device 300, first time-appended data 150c and second time-appended data 160c stored in storage 108.

Processor 302 of support device 300 receives first time-appended data 150c and second time-appended data 160c from controller 10 through USB controller 312. Processor 302 receives first time-appended data 150c and second time-appended data 160c and then loads and executes sorting program 326 in the main memory, so that first time-appended data 150c and second time-appended data 160c are consolidated (merged) with each other. Then, processor 302 performs a process to rearrange pieces of merged data in accordance with time-indicative values. The merging and sorting processes are described below.

E. Merging and Sorting Processes for Time-Appended Data

Figure 5:
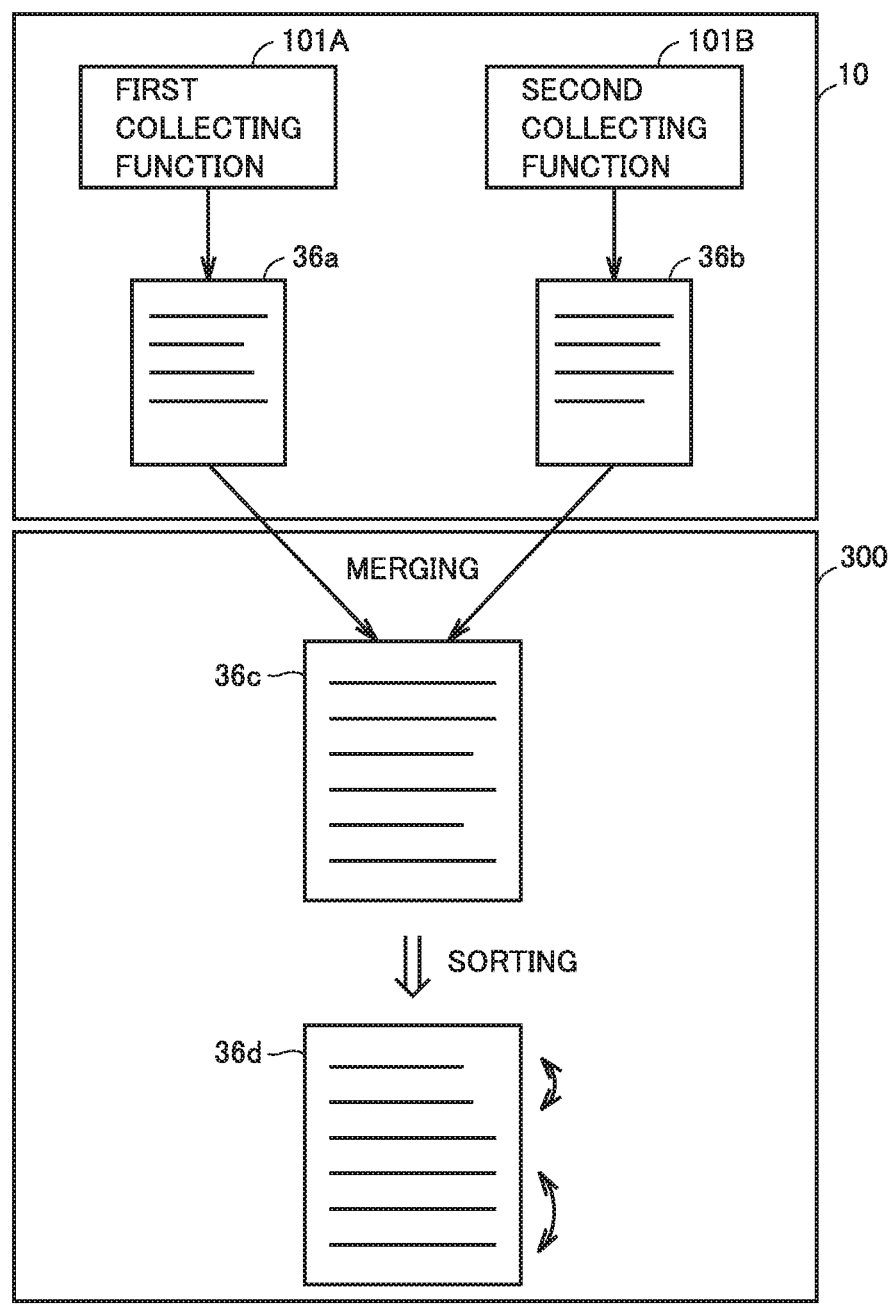
FIG. 5 is a diagram that illustrates merging and sorting processes according to embodiments.

FIG. 5 is a diagram that illustrates merging and sorting processes according to embodiments. When processor 102 of controller 10 processes the data using first collecting function 101A, a communication recording list 36a containing a plurality of pieces of first time-appended data 150c is generated (hereinafter, may be referred to as "first communication recording list"). Specifically, in storage 108 is stored first time-appended data 150c appended with first time value 150b indicating a time point for each piece of communication data generated as a result of data communication between controller 10 and external device 200A of upper-layer network N1. First communication recording list 36a contains a plurality of pieces of first time-appended data 150c thus stored in storage 108.

When processor 102 of controller 10 processes the data using second collecting function 101B, a communication recording list 36b containing a plurality of pieces of second time-appended data 160c is generated (hereinafter, may be referred to as "second communication recording list"). Specifically, in storage 108 is stored second time-appended data 160c appended with second time value 160b indicating a time point for each piece of communication data generated as a result of communication between controller 10 and external device 200B of field network N2. Second communication recording list 36b contains a plurality of pieces of second time-appended data 160c thus stored in storage 108.

FIG. 6 is a diagram that illustrates a specific example of first communication recording list 36a according to embodiments. First communication recording list 36a illustrated in FIG. 6 includes a plurality of fields relevant to communication data. First communication recording list 36a includes a serial number field 360, a time field 361, a transmission source address field 362, a reception source address field 363, a protocol field 364, a port field 365, and a data content field 366.

In serial number field 360 are stored serial numbers; identification information used to identify a target piece of communication data.

In time field 361 are stored values that each indicate a time point at which controller 10 transmits and receives communication data to and from external device 200A of upper-layer network N1. Specifically, time values and count values periodically updated are stored in this time field.

In transmission source address field 362 are stored addresses of destinations of target packets or target frames (physical addresses and/or network addresses).

In reception source address field 363 are stored addresses at which the target packets or target frames are received (physical addresses and/or network addresses).

In protocol field 364 is stored information that indicates protocols used to transmit and receive the target packets or target frames. Specific examples of the information that indicates protocols may include "HTTP", "FTP" and "TCP".

In port field 365 are stored port numbers used to transmit and receive the target packets or target frames.

In data content field 366 are stored contents in part or in whole of the target packets or target frames (for example, header information, preambles)

For example, first communication recording list 36a illustrated in FIG. 6 contains three different pieces of first time-appended data 150ca, 150cb and 150cc and further contains information in the fields relevant to these pieces of data. It should be understood that first communication recording list 36a may contain two or less or four or more pieces of data. The number of data recorded in first communication recording list 36a increases as controller 10 and external device 200A of the upper-layer network continue to transmit and receive communication data to and from each other.

FIG. 7 is a diagram that illustrates a specific example of second communication recording list 36b according to embodiments. Second communication recording list 36b illustrated in FIG. 7 has basically the same fields as in first communication recording list 36a described earlier. First communication recording list 36a and second communication recording list 36b are, however, different in that second communication recording list 36b contains a data type field 367 in place of reception source address field 363 of first communication recording list 36a. In data type field 367 is stored information that indicates types of the target packets or target frames in the recorded accesses. Specific examples of the types of the communication data may include "Broadcast" and "Multicast".

In FIG. 7, the number of data recorded in second communication recording list 36b increases as controller 10 and external device 200B of field network N2 continue to transmit and receive communication data to and from each other.

For example, second communication recording list 36b illustrated in FIG. 7 contains 12 pieces of second time-appended data 160c. Among these data, second time-appended data 160ca, 160cb and 160cc correspond to first time-appended data 150ca, 150ab and 150cc of upper-layer network N1 which are communicated through different networks.

Below is described a relationship between different pieces of time-appended data by way of example of first time-appended data 150ca and second time-appended data 160ca illustrated in FIG. 6 and FIG. 7.

When external device 200A of upper-layer network N1 (for example, MES server 200a) transmits communication data to external device 200B of field network N2 (for example, image sensor 200d), time-appended data described below is stored in storage 108.

Processor 102 prompts first collecting function 101A to collect communication data transmitted to controller 10 from MES server 200a of upper-layer network N1. Further, processor 102 stores, in storage 108, first time-appended data 150ca associated with a value indicating a time point at which this communication data is received by controller 10. Thus, processor 102 adds, to first communication recording list 36a illustrated in FIG. 6, first time-appended data 150ca containing values of time field 361 and of the other fields of communication recording list 36a.

Processor 102 prompts second collecting function 101B to collect communication data to be transmitted from controller 10 to image sensor 200d of field network N2. Further, processor 102 stores, in storage 108, second time-appended data 160ca associated with a value indicating a time point at which this communication data is transmitted by controller 10. Thus, processor 102 adds, to second communication recording list 36b illustrated in FIG. 7, second time-appended data 160ca containing values of time field 361 and of the other fields of second communication recording list 36b.

When communication data is transmitted from MES server 200a of upper-layer network N1 to image sensor 200d of the field network, there is less time lag between a time point at which controller 10 receives the communication data from MES server 200a and a time point at which the communication data is transmitted to image sensor 200d (very small time interval between the reception and transmission of this data). In that case, the two pieces of time-appended data are relevant data communicated through different networks. Thus, controller 10 can facilitate the collection of communication data transmitted and/or received through different networks needed to identify factors causing any communication errors.

First time-appended data 150cb and second time-appended data 160cb, and first time-appended data 150cc and second time-appended data 160cc are pieces of communication data respectively communicated through different networks. Of these data, the first time-appended data is added to first communication recording list 36a, while the second time-appended data is added to second communication recording list 36b.

Referring to FIG. 5 again, first communication recording list 36a and second communication recording list 36b thus generated by controller 10 are transmitted to support device 300. The data transmission from controller 10 to support device 300 may be carried out by a user via input unit 316 of support device 300, or may be regularly carried out at predetermined time intervals.

First communication recording list 36a and second communication recording list 36b are received by processor 302 of support device 300. Upon the receipt of first communication recording list 36a and second communication recording list 36b, processor 302 loads and executes sorting program 326 in primary storage 306. Processor 302 thus loads and executes sorting program 326 in primary storage 306 to merge first communication recording list 36a and second communication recording list 36b into one list (first consolidated communication recording list 36c).

FIG. 8 is a diagram that illustrates first consolidated communication recording list 36c according to embodiments in which first communication recording list 36a and second communication recording list 36b are merged with each other.

Sorting program 326 is loaded and executed in primary storage 306 by processor 302 of support device 300 to merge the respective recording lists into one list. FIG. 8 illustrates contents of first consolidated communication recording list 36c generated as a result of the merging process being performed by processor 302. In first consolidated communication recording list 36c, a plurality of pieces of first time-appended data and a plurality of second time-appended data are arranged in order of serial numbers recited in serial number field 360. The plurality of first time-appended data include first time-appended data 150ca, 150cb and 150cc. The plurality of second time-appended data include second time-appended data 160ca, 160cb and 160cc. At the time of these pieces of data being merged, the pieces of first time-appended data included in first communication recording list 36a and the pieces of second time-appended data included in second communication recording list 36b are respectively arranged in order of serial numbers.

Then, processor 302, using the process of sorting program 326, generates a second consolidated communication recording list 36d in which the pieces of time-appended data included in first consolidated communication recording list 36c are sorted in accordance with time-indicative values. Processor 302 displays an image containing the generated list on display unit 318 of support device 300.

Figure 9:
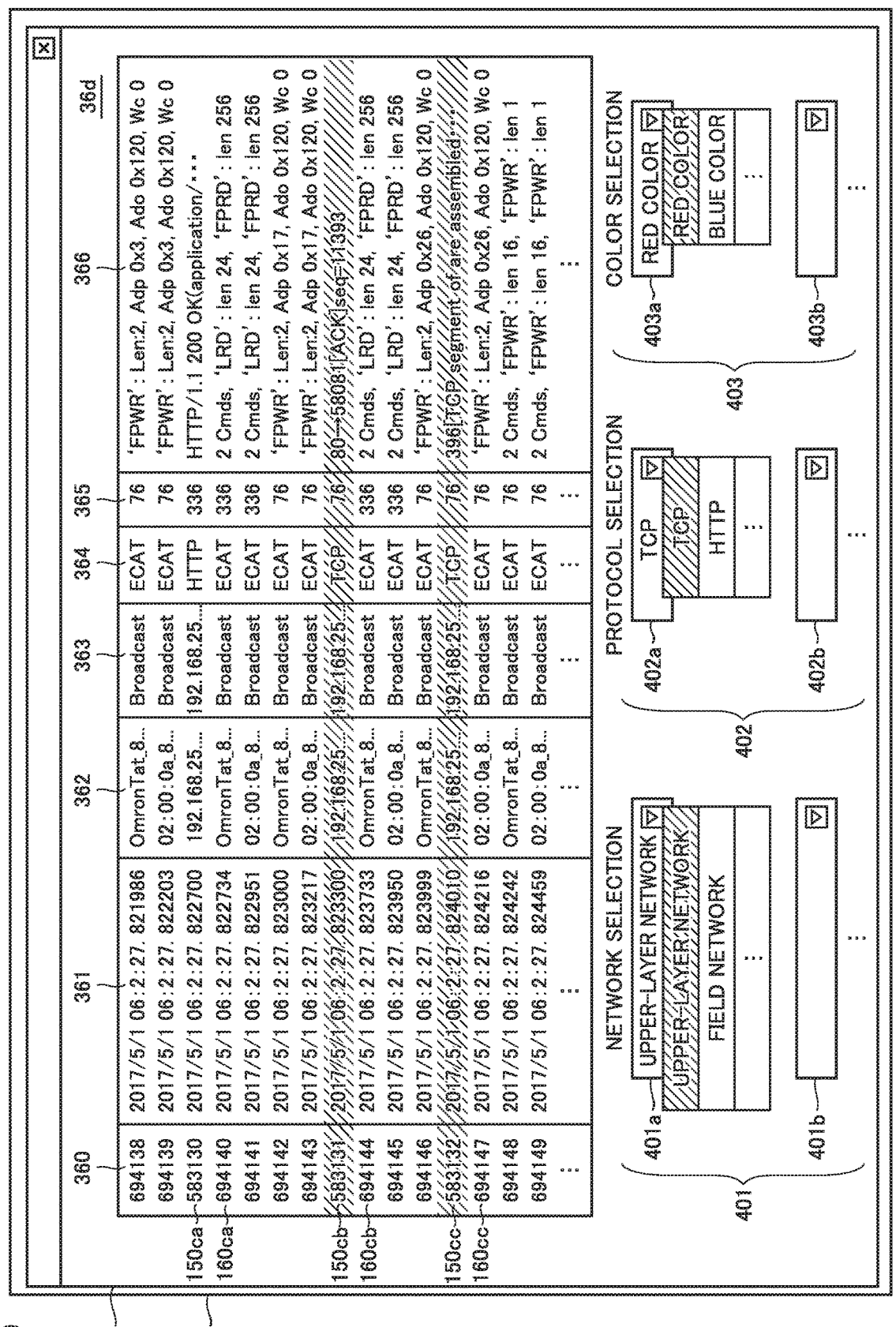
FIG. 9 is a diagram that illustrates an exemplified image 400a containing a second consolidated communication recording list 36d according to embodiments generated as a result of the sorting process being performed.

FIG. 9 is a diagram that illustrates an exemplified image 400a containing second consolidated communication recording list 36d according to embodiments generated as a result of the sorting process being performed.

Second consolidated communication recording list 36d is a list in which the pieces of time-appended data in order of serial numbers recited in first consolidated communication recording list 36c are rearranged by processor 302 in accordance with time-indicative values. For example, processor 302 generates second consolidated communication recording list 36d by rearranging, in chronologically ascending order, the pieces of first time-appended data 150c and of second time-appended data 160c included in first consolidated communication recording list 36c. Image 400a containing second consolidated communication recording list 36d is displayed on display unit 318.

Specifically, processor 302 arranges two pieces of time-appended data communicated through different networks in chronological order (vertically one after the other). For example, processor 302 may put second time-appended data 160ca immediate after first time-appended data 150ca illustrated in FIG. 9. Further, processor 302 may put second time-appended data 160cb immediately after first time-appended data 150cb, and second time-appended data 160cc immediately after first time-appended data 150cc. Thus, processor 302 generates image 400a containing second consolidated communication recording list 36d by rearranging, in chronologically ascending order, different pieces of time-appended data included in first consolidated communication recording list 36c. Processor 302 displays image 400a thus generated on display unit 318. On display unit 318 is thus displayed the image of second consolidated communication recording list 36d containing vertically arranged pieces of data obtained from relevant processes that involve different networks. Then, a user who sees the image can chronologically check the communication data record obtained from relevant processes that involve different networks. This can greatly help the user to analyze factors causing any data communication errors.

In the example described above, processor 302 rearranges the time-appended data in chronologically ascending order. Processor 302 may rearrange the time-appended data otherwise (for example, in chronologically descending order).

In the example described above, the merging and sorting processes are performed by processor 302 of support device 300. Instead, processor 102 of controller 10 may perform the merging and sorting processes. In this instance, the sorting program is stored in storage 108 of controller 10 and then loaded and executed in main memory 106 by processor 102 of controller 10.

Image 400a of FIG. 9 includes a network selector 401 in which a particular piece of time-appended data is selectable based on field information, and further includes a protocol selector 402 and a color selector 403.

Network selector 401 includes entry items; a first network selection 401a and a second network selection 401b. Protocol selector 402 includes entry items; a first protocol selection 402a and a second protocol selection 402b. Color selector 403 includes entry items; a first color selection 403a and a second color selection 403b.

The network selection in network selector 401 is an entry for setting conditions to select the time-appended data, in which the time-appended data communicated through a particular one of the networks is selectable.

The protocol selection of protocol selector 402 is an entry for setting conditions to select the time-appended data, in which time-appended data communicated in compliance with a particular communication protocol is selectable.

The color selection of color selector 403 is an entry for selecting a desired color(s) for display of the time-appended data that have been selected based on the above two entries.

In these entries of the respective selectors, desired values or data are selected and set by a user via input unit 316 of support device 300. Depending on the inputs from the user in these entries, processor 302 changes the display mode of image 400a to be displayed on display unit 318.

For example, when a user selects, via input unit 316, "upper-layer network" in first network selection 401a, "HTTP" in first protocol selection 402a of protocol selector 402, and "red color" in first color selection 403a of color selector 403, processor 302 displays image 400a on display unit 318 correspondingly to what is selected by the user. Specifically, among first time-appended data 150ca, 150cb and 150cc relevant to external device 200A of upper-layer network N1, first time-appended data 150cb and 150cc are highlighted and displayed. First time-appended data 150cb and 150cc with "TCP" in protocol field 364 are highlighted in red color.

Such a highlighted display of the time-appended data that satisfy the conditions selected by a user may allow the user to easily recognize this time-appended data and the other time-appended data relevant to the highlighted data. This can greatly help the user to analyze factors causing data communication errors.

Network selector 401 includes second network selection 401b in addition to first network selection 401a. Protocol selector 402 includes second protocol selection 402b in addition to first protocol selection 402a. Color selector 403 includes second color selection 403b in addition to first color selection 403a.

Second network selection 401b, second protocol selection 402b and second color selection 403b respectively have the same functions as in the entries for selection described earlier. The entries described earlier include first network selection 401a, first protocol selection 402a and first color selection 403a. A user, by setting conditions for data extraction in these entries, can extract the time-appended data based on different conditions, like a piece of data on one condition and a different piece of data on another condition.

In the description earlier, processor 302 extracts the time-appended data that satisfies the conditions of first network selection 401a and of first protocol selection 402a. Processor 302 may instead select the time-appended data that satisfies either one of these conditions. In the description earlier, selectors provided to set conditions for selecting the time-appended data are network selector 401 and protocol selector 402. A selector(s) of any other type may be provided instead of or in addition to these selectors.

F. Configuration for Control of Controller 10

Figure 10:
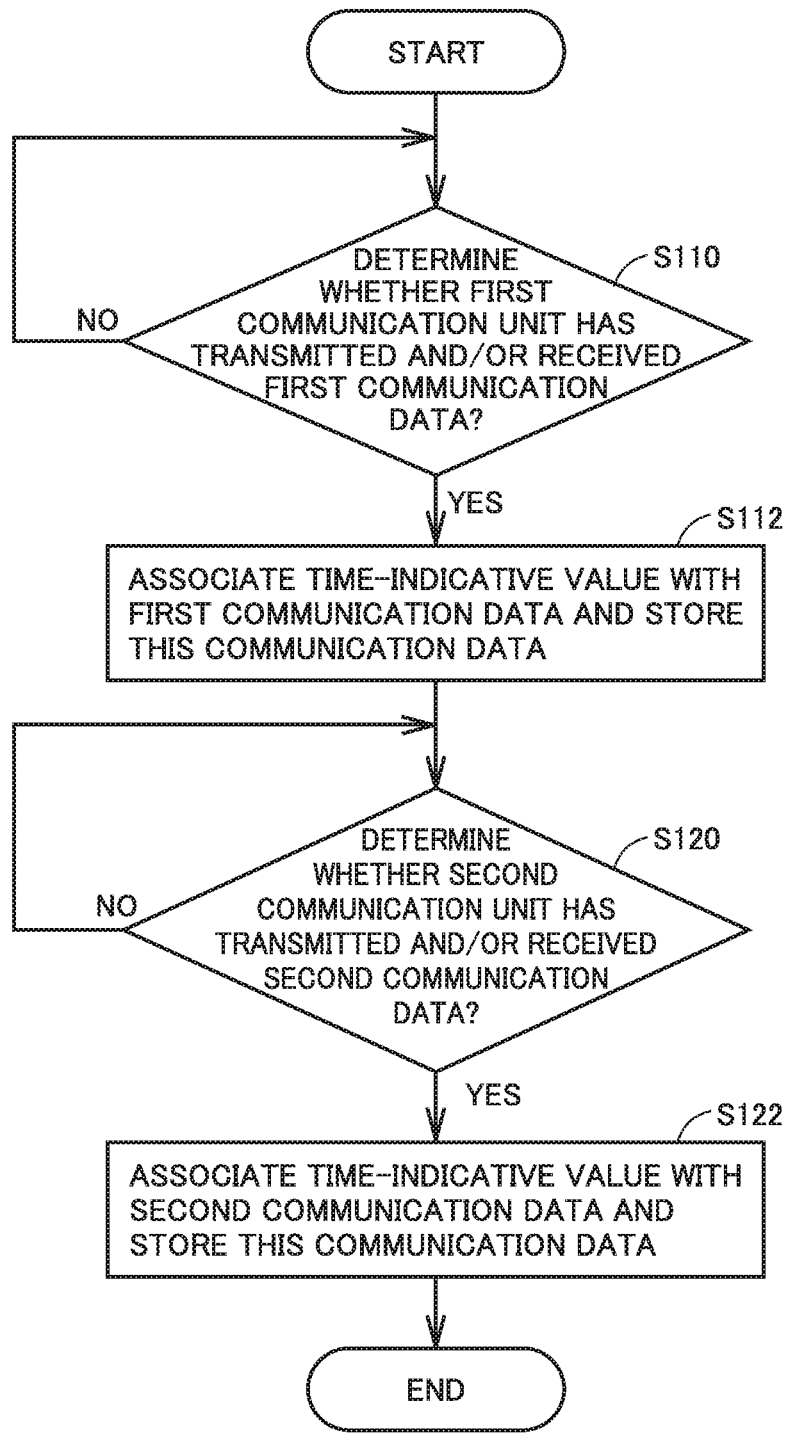
FIG. 10 is a flowchart of steps in part of a process performed by controller 10 according to embodiments.

The control configuration of controller 10 is described referring to FIG. 10. FIG. 10 is a flowchart of steps in part of the working process performed by controller 10 according to embodiments. The steps illustrated in FIG. 10 are carried out when first collecting program 1010A and second collecting program 1010B are loaded and executed in main memory 106 by controller 10. In other aspects of this disclosure, the process to be performed may be implemented in part or in whole by a circuit element(s) or a hardware component(s).

In step S110, processor 102 of controller 10 determines whether first communication unit 100A has transmitted and/or received first communication data 150a to and/or from external device 200A of upper-layer network N1 (for example, MES server 200a).

When it is determined that first communication unit 100A has transmitted and/or received first communication data 150a (YES in step S110), processor 102 proceeds to step S112. Otherwise (NO in step S110), processor 102 performs the process of step S110 again. Processor 102 may end step S110 in case this step is repeated a predetermined number of times or more.

In step S112, processor 102 collects first communication data 150a into main memory 106. Processor 102 stores, in storage 108, first time-appended data 150c in which first communication data 150a is associated with first time value 150b indicative of a time point at which first communication data 150a is received.

In step S120, processor 102 determines whether second communication unit 100B has transmitted and/or received the second communication data to and/or from external device 200B of field network N2 (for example, image sensor 200d).

When it is determined that second communication unit 100B has transmitted and/or received second communication data 160a (YES in step S120), processor 102 proceeds to step S122. Otherwise (NO in step S120), processor 102 performs the process of step S120 again. Processor 102 may end step S120 in case this step is repeated a predetermined number of times or more.

In step S122, processor 102 collects second communication data 160a into main memory 106. Processor 102 stores, in storage 108, second time-appended data 160c in which second communication data 160a is associated with second time value 160b indicative of a time point at which second communication data 160a is received.

This can facilitate the collection of communication data transmitted and/or received through different networks distinct from each other and needed to identify factors causing any communication difficulties/errors.

The steps described with reference to FIG. 10 are applicable to steps carried out by processor 102 of controller 10 when second communication unit 100B transmits, to external device 200B of field network N2, first communication data 150a received by first communication unit 100A from external device 200A of upper-layer network N1 as second communication data 160a. The steps described with reference to FIG. 10 are also applicable to steps carried out likewise when first communication unit 100A transmits, to external device 200A of upper-layer network N1, the communication data received by second communication unit 100B from external device 200B of field network N2.

G. Control Configuration of Support Device 300

Figure 11:
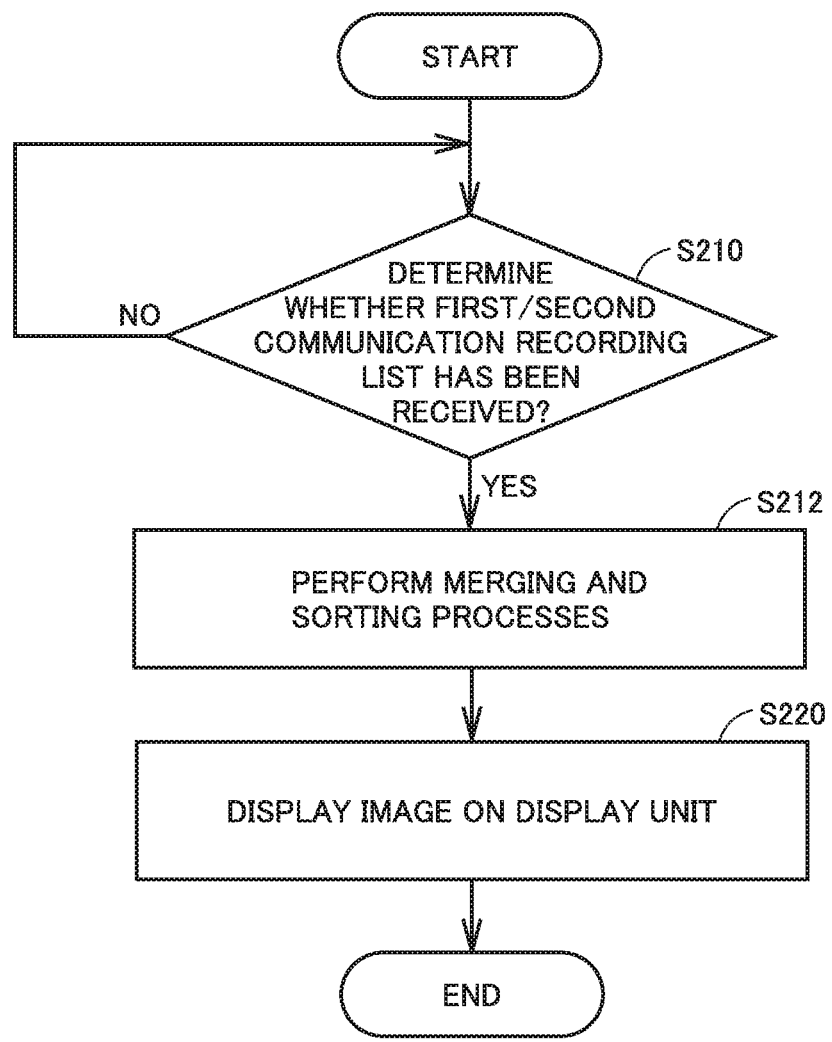
FIG. 11 is a flowchart of steps in part of a process performed by support device 300 according to embodiments.

The control configuration of support device 300 is described next referring to FIG. 11. FIG. 11 is a flowchart of steps in part of the process performed by support device 300 according to embodiments. The steps illustrated in FIG. 11 are carried out when sorting program 326 is loaded and executed in primary storage 306 by support device 300. In other aspects of this disclosure, the process to be performed may be implemented in part or in whole by a circuit element(s) and/or a hardware component(s).

In step S210, processor 302 of support device 300 determines whether first communication recording list 36a and second communication recording list 36b have been received from controller 10 through USB controller 312.

When the receipt of first communication recording list 36a and second communication recording list 36b is confirmed (YES in step S210), processor 302 proceeds to step S212. Otherwise (NO in step S210), processor 302 performs the process of step S210 again. Processor 302 may end step S210 in case this step is repeated a predetermined number of times or more.

In step S212, processor 302 merges first communication recording list 36a and second communication recording list 36b with each other (to generate first consolidated communication recording list 36c). Processor 302 sorts the time-appended data included in these lists in accordance with time-indicative values (to generate second consolidated communication recording list 36d).

In step S220, processor 302 displays, on display unit 318, image 400a containing second consolidated communication recording list 36d obtained by the sorting process. Then, a user who sees the image can chronologically check the communication data record obtained from relevant processes that involve different networks. This can greatly help the user to analyze factors causing any data communication errors.

In response to the entries for selection of the selectors included in image 400a being changed in response to inputs from a user via input unit 316, processor 302 changes the display mode of communication data that satisfies the conditions set by the user. This may allow the user to easily check any target data to be analyzed to find out what is causing communication errors.

H. Wrap-Up Summary

As described earlier, processor 102 of controller 10 in FA system 1 prompts first collecting function 101A and second collecting function 101B to collect, into main memory 106, first communication data 150a transmitted and/or received by first communication unit 100A connected to upper-layer network N1 and second communication data 160a transmitted and/or received by second communication unit 100B connected to field network N2 distinct from upper-layer network N1. Processor 102 associates first communication data 150a and second communication data 160a thus collected with values indicative of time points when these data are transmitted and/or received.

Specifically, processor 102 stores, in storage 108, first time-appended data 150c in which first communication data 150a is associated with first time value 150b indicative of a time point at which first communication data 150a is transmitted and/or received by first communication unit 100A. Also, processor 102 stores, in storage 108, second time-appended data 160c in which second communication data 160a is associated with second time value 160b indicative of a time point at which second communication data 160a is transmitted and/or received by second communication unit 100B.

Thus, first communication unit 100A and second communication unit 100B included in control device 10 of control system 1 are respectively connected to different networks; upper-layer network N1, and field network N2. Thus, first communication unit 100A and second communication unit 100B are so configured that one of these units connected to a network transmits communication data received by the other connected to another network. When one of the communication units receives communication data, control device 10 collects the received communication data, associates this communication data with a time-indicative value outputted from a time management device; timer 116, and then stores the resulting communication data in storage 108. When one of the communication units transmits communication data received by the other communication unit, the control device collects the communication data to be transmitted, associates this communication data with a time-indicative value outputted from timer 116, and then stores the resulting communication data in storage 108.

This can facilitate the collection of communication data transmitted and/or received through different networks distinct from each other and needed to identify factors causing any communication difficulties/errors. Further advantageously, adding a hub(s) at the time of trouble shooting may become unnecessary, and reproduction of communication errors if any hub is added may be accordingly unnecessary.

Processor 302 of support device 300 in FA system 1 rearranges first time-appended data 150c and second time-appended data 160c in accordance with the time-indicative values. This may allow a relationship to be clearly defined between different pieces of communication data necessary for identifying communication errors.

Processor 302 of support device 300 displays, on display unit 318, image 400a containing second consolidated communication recording list 36d in which pieces of relevant data are rearranged. Then, any communication data necessary for identifying communication errors can be chronologically rearranged and displayed to a user.

I. Other Examples of Application

Other examples of application of FA system 1 according to embodiments are hereinafter described.

I-1. Filtering Using Collecting Function

All of the communication data is target data to be selected in the collection of first communication data 150a and second communication data 160a (hereinafter, may be collectively referred to as "communication data") using first collecting function 101A and second collecting function 101B (hereinafter, collectively referred to as "collecting function") described thus far. When processor 102 collects communication data using the collecting function, certain pieces of communication data satisfying preset conditions alone may instead be collected, in which case filtering conditions for communication data may be set in accordance with instructions included in user program 110.

An example of the process to collect the communication data based on preset filtering conditions is hereinafter described. While a function block diagram (FBD) is used in the description below, one of the ladder diagram (LD), instruction list (IL), structured text (ST) and sequential function chart (SFC) may be selected, or two or more of them may be combined and used to perform this process. Instead, one selected from other program languages may be employed to perform this process, for example, a universal program language such as JavaScript (registered trademark) or C language.

Figure 12:
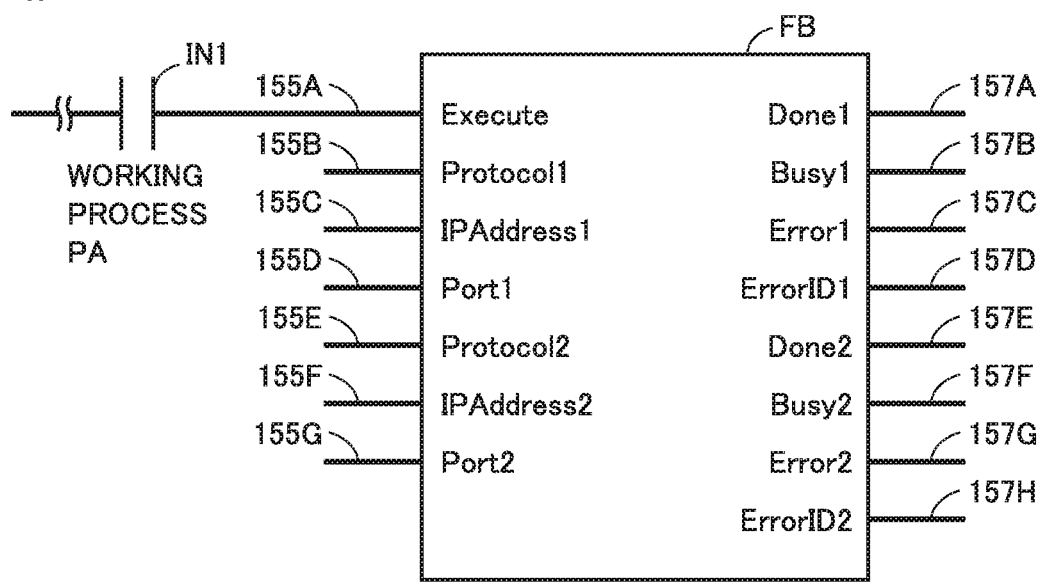
FIG. 12 is a diagram that illustrates a function block FB according to embodiments.

FIG. 12 is a diagram that illustrates a function block FB according to embodiments. To collect the communication data using the collecting function, processor 102 sets filtering conditions in accordance with instructions included in user program 110. The instructions included in user program 110 may be, for example, defined with function block FB.

Function block FB includes input units 155A to 155G for input of filtering conditions to be set, and output units 157A to 157H for output of a result obtained by setting the filtering conditions.

Filtering conditions to be set are inputted to input units 155A to 155G. The filtering conditions are changeable with values inputted to input units 155A to 155G. The values thus inputted may be specific values, for example, "Protocol", "IP Address", and "Port", as described later. Thus, processor 102, using the collecting function, sets filtering conditions to collect communication data with such direct instructions.

A variable, "PA", is allocated to an input element IN1. The "PA" is a variable of BOOL type, and its initial value is "False" (=OFF). Though not illustrated in FIG. 13, a control function for a working process to be performed is defined in user program 110. This control function outputs control instructions to external device 200A or external device 200B in accordance with specific operation controls provided therein. The control function is so defined that the value of variable "PA" is set to "True" (=ON) during the ongoing working process and is set to "False" (=OFF) otherwise. Thus, the filtering condition suitable for the working process is set by function block FB on the condition that variable "PA" usable in user program 110 has a predetermined value (for example, "True").

Input unit 155A illustrated with "Execute" in FIG. 12 receives an input that designates whether the process to set the filtering condition should be performed. For example, input unit 155A receives an input, "True" or "False". Collecting function 201 does not set the filtering condition insofar as input unit 155A receives the input of "False". When input unit 155A receives the input of "True", on the other hand, a collecting function 201 sets the filtering condition. In this instance, a filtering condition inputted to the other input units, 155B to 155D, is newly set as a filtering condition. Controller 10 is thus allowed to directly change the filtering conditions in accordance with instructions included in user program 110.

Input unit 155B illustrated with "Protocol1" in FIG. 12 receives an input that designates the communication protocol of target communication data to be filtered collected by processor 102 using first collecting function 101A. For example, input unit 155B receives the input of information that identifies a communication protocol. This identification information may be designated with the name of the communication protocol or may be designated with ID (identification) of the communication protocol. For example, input unit 155B receives an input, "TCP" or "FTP". When "TCP" is inputted to input unit 155B, processor 102 sets the filtering condition using first collecting function 101A, so that communication data that complies with the TCP protocol is selected as target data to be filtered. When "FTP" is inputted to input unit 155B, on the other hand, collecting function 201 changes the filtering condition, so that communication data that complies with the FTP protocol is selected as target data to be filtered. Thus, controller 10 may be allowed to freely change the protocol condition which is an entry of the condition set to collect the communication data.

Input unit 155C illustrated with "IP Address1" in FIG. 12 receives an input that designates the IP address of a target device of communication data to be filtered collected by processor 102 using first collecting function 101A. When, for example, "10.0.0.1" is inputted to input unit 155C, processor 102 changes the filtering condition using first collecting function 101A. Specifically, processor 102 changes the filtering condition, so that communication data to be transmitted to the device with the IP address of "10.0.0.1" (destination device) is selected as target data to be filtered. Thus, controller 10 may be allowed to freely change the IP address which is an entry of the condition to be set for collecting the communication data.

Input unit 155D illustrated with "Port 1" in FIG. 12 receives an input that designates the port number of a target device of communication data to be filtered collected by processor 102 using first collecting function 101A. When, for example, "80" is inputted to input unit 155D, processor 102 changes the filtering condition using first collecting function 101A, so that the communication data to be transmitted to the destination device with the port number of "80" is selected as target data to be filtered. Controller 10 may be thus allowed to freely change the port number which is an entry of the condition set to collect the communication data.

Input unit 155E illustrated with "Protocol2" in FIG. 12 receives an input that designates the communication protocol of target communication data to be filtered collected by processor 102 using second collecting function 101B. The "Protocol2" functions similarly to the "Protocol1".

Input unit 155F illustrated with "IP Address2" in FIG. 12 receives an input that designates the IP address of a target device of communication data to be filtered collected by processor 102 using second collecting function 101B. The "IP Address2" functions similarly to the "IP Address1".

Input unit 155G illustrated with "Port 2" in FIG. 12 receives an input that designates the port number of a target device of communication data to be filtered collected by processor 102 using second collecting function 101B. The "Port2" functions similarly to the "Port1".

Controller 10 may be thus allowed to freely change the filtering condition for each one of its entries in accordance with instructions included in user program 110.

When the filtering condition is set by first collecting function 101A as normally done, a signal indicative of the success of condition setting is outputted from output unit 157A illustrated with "Done1" in FIG. 12. While the filtering condition is being set by first collecting function 101A, a signal indicative of the ongoing condition change is outputted from output unit 157B illustrated with "Busy1" in FIG. 12. When the filtering condition fails to be properly set by first collecting function 101A, a signal indicative of the condition setting error is outputted from output unit 157C illustrated with "Error1" in FIG. 12. In this instance, an error ID for identifying details of the error is outputted from output unit 157D illustrated with "ErrorID1" in FIG. 12.

When the filtering condition is set by second collecting function 101B as normally done, a signal indicative of the success of condition setting is outputted from output unit 157E illustrated with "Done2" in FIG. 12. While the filtering condition is being set by second collecting function 101B, a signal indicative of the ongoing condition change is outputted from output unit 157F illustrated with "Busy2" in FIG. 12. When the filtering condition fails to be properly set by second collecting function 101B, a signal indicative of the condition setting error is outputted from output unit 157G illustrated with "Error2" in FIG. 12. In this instance, an error ID for identifying details of the error is outputted from output unit 157H illustrated with "ErrorID2" in FIG. 12.

Function block FB may include, in addition to input units 155A to 155G and output units 157A to 157H, other variously different input and output units. For example, function block FB may include an input unit(s) that designates a communication interface in the case of a plurality of communication interfaces.

I-2. Another Example of Image Generated by Sorting Process

Figure 13:
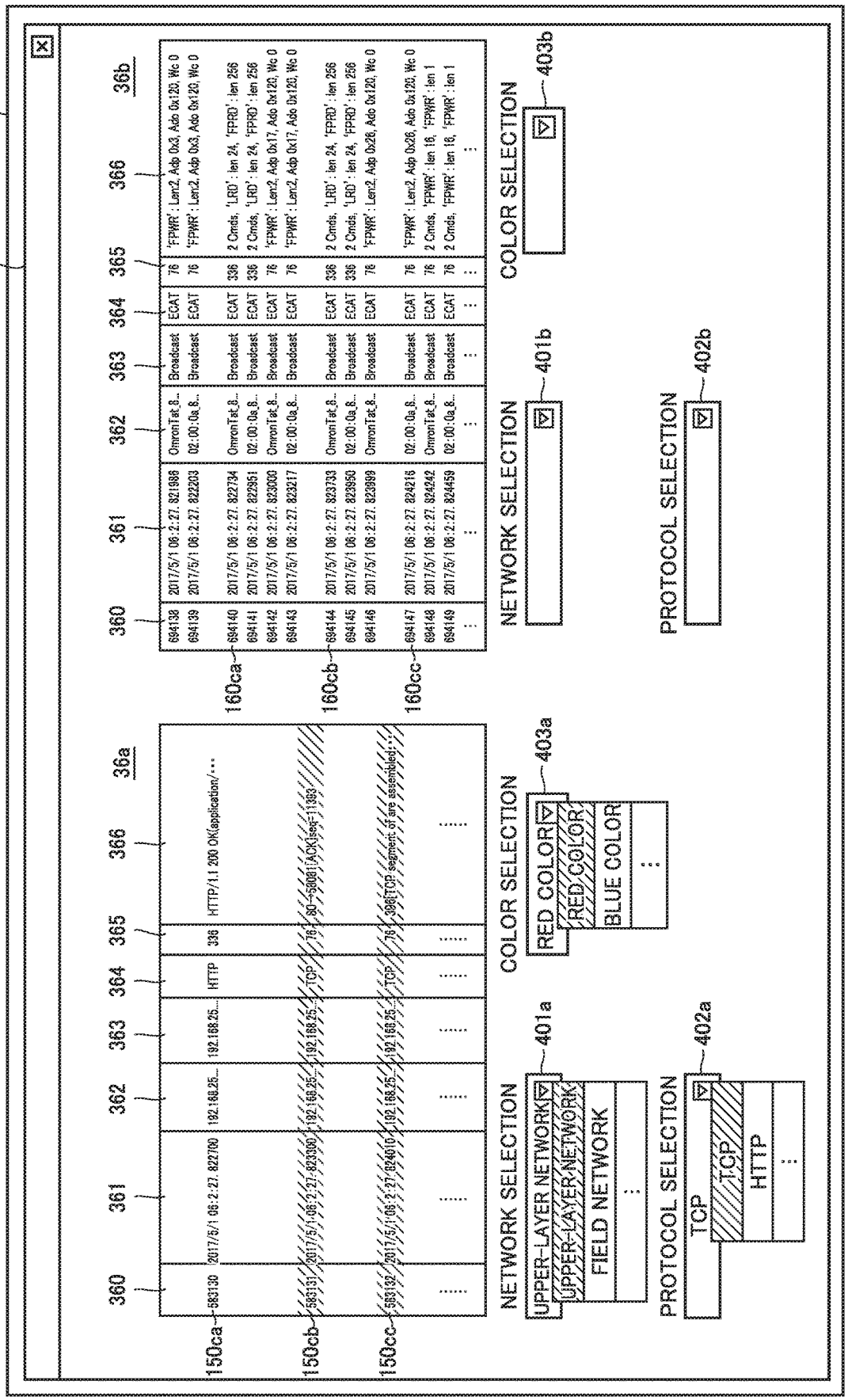
FIG. 13 is a diagram that illustrates another exemplified image according to embodiments generated as a result of the sorting process being performed.

FIG. 13 is a diagram that illustrates another exemplified image according to embodiments generated as a result of the sorting process being performed. Image 400a described earlier includes second consolidated communication recording list 36d generated subsequent to the merging and sorting processes. In the case of an image 400b illustrated in FIG. 13, first communication recording list 36a and second communication recording list 36b are not merged but are separately subjected to the sorting process. This image is similar to image 400a in any other respects. Image 400b thus characterized displayed on display unit 318 of support device 300 can greatly help a user to analyze the error-causing factors. Specifically, a user can easily analyze factors causing communication errors by comparing pieces of time-appended data that are chronologically arranged in first communication recording list 36a and in second communication recording list 36b.

Figure 14:
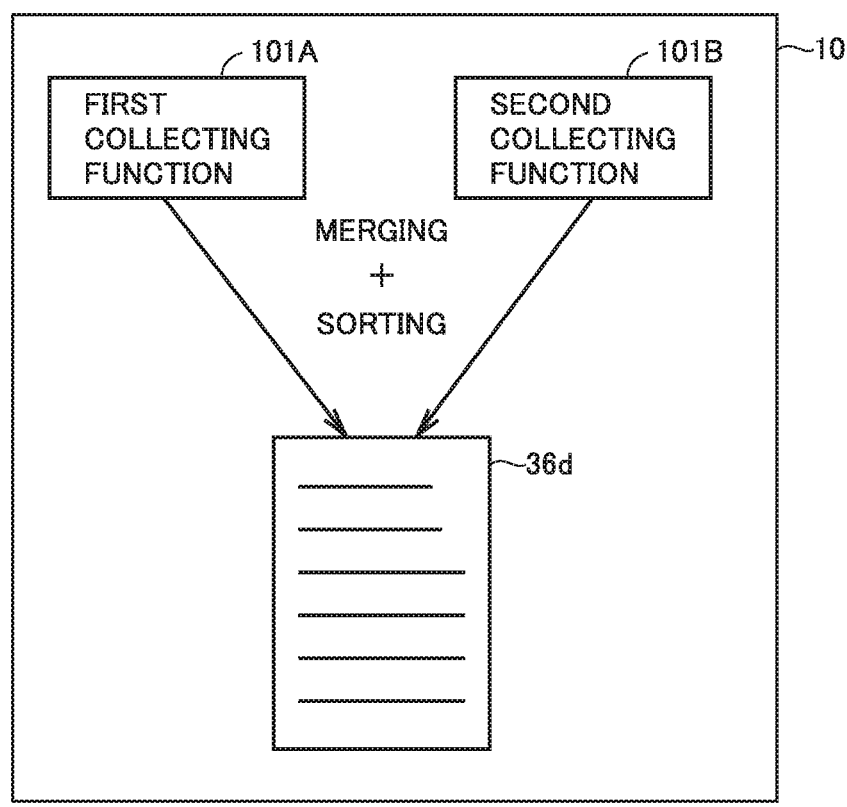
FIG. 14 is a diagram that illustrates another example of the merging and sorting processes according to embodiments.

I-3. Another Example of Merging and Sorting Processes for Time-Appended Data FIG. 14 is a diagram that illustrates another example of the merging and sorting processes according to embodiments. In FIG. 5, first communication recording list 36a and second communication recording list 36b respectively containing the communication data collected by processor 102 of controller 10 using first collecting function 101A and second collecting function 101B are merged by processor 302 of support device 300 into first consolidated communication recording list 36c. Processor 302 sorts pieces of time-appended data in accordance with time-indicative values in the consolidated list and thereby generates second consolidated communication recording list 36d containing the pieces of time-appended data sorted in this manner.

As illustrated in the processes of FIG. 14, the communication data collected by processor 102 of controller 10 using first collecting function 101A and second collecting function 101B may be chronologically collected into one list 36e. This can alleviate a processing load, as compared with the processes described earlier in which the processor merges different lists and sorts pieces of data in the merged list.

J. Modified Example

While the filtering conditions are changed in accordance with the working process in the description given so far, user program 110 may be programmed to change the filtering conditions in accordance with other statuses. For example, user program 110 may be programmed to set the filtering conditions suitable for the system configuration of FA system 1 in case external device 200A or 200B of FA system 1 is reconfigured. This may allow controller 10 to block any undesired communication devices if they are accidentally or intentionally connected to controller 10. Whether a communication device(s) is connected or not connected may be detected by the use of a function block(s) that monitors the current network status. Such a function block may monitor the status of a network table at regular intervals and detect from information of changes in the network table whether a communication device(s) is connected or not connected.

For example, user program 110 may be programmed to set filtering conditions that prevent any ill-intentioned attack from an external apparatus if the control device is under such an attack. In this instance, the communication driver of controller 10 monitors the volume of received data per unit time (for example, the number of received packets per unit time) and confirms that an ill-intentioned attack from an external apparatus is occurring when the volume of received data exceeds a predetermined threshold. Upon the detection of such an ill-intentioned attack from an external apparatus, the collecting function blocks the external apparatus responsible for the attack based on information of, for example, IP address and/or port number. Alternatively, the collecting function may block all of incoming communication packets upon the detection of any ill-intentioned attack from an external apparatus.

For possible changes in communication-related connections of controller 10, user program 110 may be programmed to set filtering conditions in accordance with the current status of such connections. For example, collecting function 201 may only allow passage of data received from a source device once the communication with the source device is established until the connection to this device is lost, while blocking any data from the source device otherwise. The collecting function, by thus allowing passage of communication data solely during a required period of time, can successfully provide an improved level of security.

K. Supplementary Note

As described thus far, the embodiments include the following technical aspects.

[Aspect 1] A control system (1) including a control device (10) that controls a control target is provided. Control device (10) includes:

a first communication unit (100A) connected to a first network (N1);

a second communication unit (100B) connected to a second network (N2) distinct from the first network;

a timer (116) that manages a value indicative of time;

a first collecting function (101A) that, when the first communication unit (100A) transmits and/or receives communication data, collects the communication data transmitted and/or received by the first communication unit (100A) as first communication data (150a) and stores in a storage the first communication data (150a) associated with a value indicating a time point at which the first communication data (150a) is transmitted and/or received; and a second collecting function (101B) that, when the second communication unit (100B) transmits and/or receives communication data, collects the communication data transmitted and/or received by the second communication unit (100B) as second communication data (160a) and stores in the storage the second communication data (160a) associated with a value indicating a time point at which the second communication data (160a) is transmitted and/or received.

[Aspect 2] The control system as described in aspect 1, further including a sorting unit that rearranges first communication data (150a) associated with the value indicating the time point and second communication data (160a) associated with the value indicating the time point in accordance with the values indicating the time points.

[Aspect 3] The control system as described in aspect 2, further including a support device (300) that acquires, from control device (10), first communication data (150a) associated with the value indicating the time point and second communication data (160a) associated with the values indicating the time point, and support device (300) includes the sorting unit.

[Aspect 4] The control system as described in aspect 3, further characterized in that support device (300) includes a display unit (318) that displays an image (400a, 400b) containing a set of the communication data rearranged by the sorting unit.

[Aspect 5] The control system as described in aspect 4, further characterized in that display unit (318) displays in a different manner a piece of communication data from among the set of the communication data rearranged by the sorting unit that satisfies a condition specified by a user.

[Aspect 6] The control system as described in any one of aspects 1 to 5, further characterized in that first collecting function (101A) and second collecting function (101B) collect the communication data that satisfies a predefined condition alone.

[Aspect 7] A control method is provided that is for use in a control device (10) that controls a control target, control device (10) including: a first communication unit (100A) connected to a first network (N1); and a second communication unit (100B) connected to a second network (N2) distinct from first network (N1).

The control method includes steps of:

managing a value indicative of time;

when the first communication unit transmits and/or receives communication data, collecting the communication data transmitted and/or received by the first communication unit as first communication data and storing in a storage (108) the first communication data associated with a value indicating a time point at which the first communication data is transmitted and/or received (S112); and when the second communication unit transmits and/or receives communication data, collecting the communication data transmitted and/or received by the second communication unit as second communication data and storing in the storage (108) the second communication data associated with a value indicating a time point at which the second communication data is transmitted and/or received (S122).

[Aspect 8] A control program is provided that is for use in a control device (10) configured to control a control target, control device (10) including: a first communication unit (100A) connected to a first network (N1); and a second communication unit (100B) connected to a second network (N2) distinct from first network (N1).

The control program causes control device (10) to perform the steps of:

managing a value indicative of time;

when the first communication unit (100A) transmits and/or receives communication data, collecting the communication data transmitted and/or received by the first communication unit (100A) as first communication data (150a) and storing in a storage (108) the first communication data (150a) associated with a value indicating a time point at which the first communication data (150a) is transmitted and/or received (S112); and when the second communication unit transmits and/or receives communication data, collecting the communication data transmitted and/or received by the second communication unit as second communication data and storing in the storage (108) the second communication data associated with a value indicating a time point at which the second communication data is transmitted and/or received (S122).

The embodiments disclosed herein are given by way of example in all aspects and should not be construed as limiting the scope of this disclosure. The scope of this disclosure is solely defined by the appended claims and is intended to cover the claims, equivalents, and all of possible modifications made without departing the scope of this disclosure.

REFERENCE SIGNS LIST

10: Control device, 36a: First communication recording list, 36b: Second communication recording list, 36c: First consolidated communication recording list, 36d: Second consolidated communication recording list, 100A: First communication unit, 100B: Second communication unit, 101A: First collecting function, 101B: Second collecting function, 102, 302: Processor, 104: Chipset, 106: Main memory, 108: Storage, 110: User program, 115: System program, 116: Timer, 120: Memory card interface, 122: Memory card, 130: Internal bus controller, 150a: First communication data, 150b: First time value, 150c, 150ca, 150cb, 150cc: First time-appended data, 155A, 155B, 155C, 155D, 155E, 155F, 155G, 316: Input unit, 157A, 157B, 157C, 157D, 157E, 157F, 157G, 157H: Output unit, 160a: Second communication data, 160b: Second time value, 160c, 160ca, 160cb, 160cc: Second time-appended data, 200, 200A, 200B: External device, 200P1, 200P2: Communication port, 200b: Database server, 200c: Display unit, 200d: Image sensor, 200e: Camera, 200g: Arm robot, 300: Support device, 304: Optical drive, 305: Recording medium, 306: Primary storage, 308: Secondary storage, 310, 318: Display unit, 314: Local network controller, 320: Bus, 324: Developed program, 326: Sorting program, 328: Analysis program, 360: Serial number field, 361: Time field, 363: Address field, 364: Protocol field, 365: Port field, 366: Data content field, 367: Data type field, 400a, 400b: Image, 401: Network selector, 401a: First network selection, 401b: Second network selection, 402a: First protocol selection, 402b: Second protocol selection, 403: Color selector, 403a: First color selection, 403b: Second color selection, 1010A: First collecting program, 1010B: Second collecting program, 1050: First adder, 1060: Second adder

The invention claimed is:

1. A control system comprising a control device that controls a control target, the control device comprising a processor configured with a system program and a user program to perform operations comprising:

operation as a first communication unit connected to a first network to which a server is connected;

operation as a second communication unit connected to a second network, distinct from the first network, to which a device used for manufacturing steps is connected;

operation as a timer that manages a value indicative of time;

operation as a first collecting module that, when the first communication unit transmits and/or receives communication data which satisfies a first condition, collects the communication data transmitted and/or received by the first communication unit as first communication data and stores in a storage the first communication data associated with a value indicating a time point at which the first communication data is transmitted and/or received, operation as a second collecting module that, when the second communication unit transmits and/or receives communication data which satisfies a second condition, collects the communication data transmitted and/or received by the second communication unit as second communication data and stores in the storage the second communication data associated with a value indicating a time point at which the second communication data is transmitted and/or received, wherein each of the first communication data and the second communication data comprises a transmission source address, a reception source address, a type of protocol, and a port number, and the first condition and the second condition are defined in accordance with instructions included in the user program and related to the address, the type of protocol and, the port number.

2. The control system according to claim 1, wherein the processor is configured with the program to perform operations further comprising operation as a sorting module that rearranges the first communication data associated with the value indicating the time point and the second communication data associated with the value indicating the time point in accordance with the values indicating the time points.

3. The control system according to claim 2, wherein the processor is configured with the program to perform operations further comprising operation as a support device that acquires, from the control device, the first communication data associated with the value indicating the time point and the second communication data associated with the value indicating the time point, wherein the support device comprises the sorting module.

4. The control system according to claim 3, wherein the processor is configured with the program such that the support device comprises a display unit that displays an image containing a set of the communication data rearranged by the sorting module.

5. The control system according to claim 4, wherein the processor is configured with the program such that the display unit displays in a different manner a piece of communication data from among the set of the communication data rearranged by the sorting module that satisfies a condition specified by a user.

6. A control method for a control device that controls a control target with a system program and a user program, the control device comprising:
   a first communication unit connected to a first network to which a server is connected; and
   a second communication unit connected to a second network, distinct from the first network, to which a device used for manufacturing steps is connected, the control method comprising:
   managing a value indicative of time;
   when the first communication unit transmits and/or receives communication data which satisfies a first condition, collecting the communication data transmitted and/or received by the first communication unit as first communication data and storing in a storage the first communication data associated with a value indicating a time point at which the first communication data is transmitted and/or received; and
   when the second communication unit transmits and/or receives communication data which satisfies a second condition, collecting the communication data transmitted and/or received by the second communication unit as second communication data and storing in the storage the second communication data associated with a value indicating a time point at which the second communication data is transmitted and/or received, wherein
   each of the first communication data and the second communication data comprises a transmission source address, a reception source address, a type of protocol, and a port number, and
   the first condition and the second condition are defined in accordance with instructions included in the user program and related to the address, the type of protocol and, the port number.

7. The control method according to claim 6, further comprising rearranging the first communication data associated with the value indicating the time point and the second communication data associated with the value indicating the time in accordance with the values indicating the time points.

8. The control method according to claim 7, further comprising acquiring, from the control device to a support device, the first communication data associated with the value indicating the time point and the second communication data associated with the value indicating the time point.

9. The control method according to claim 8, further comprising displaying, at the support device, an image containing a set of the communication data that is rearranged.

10. The control method according to claim 9, further comprising displaying, at the support device, in a different manner a piece of communication data from among the set of the rearranged communication data that satisfies a condition specified by a user.

11. A non-transitory computer-readable storage medium storing a control program for a control device that controls a control target, the control device comprising:
   a first communication unit connected to a first network to which a server is connected; and
   a second communication unit connected to a second network, distinct from the first network, to which a device used for manufacturing steps is connected, the control program that causing the control device to perform:
   updating a value indicative of time;
   when the first communication unit transmits and/or receives communication data which satisfies a first condition, collecting the communication data transmitted and/or received by the first communication unit as first communication data and storing in a storage the first communication data associated with a value indicating a time point at which the first communication data is transmitted and/or received; and
   when the second communication unit transmits and/or receives communication data which satisfies a second condition, collecting the communication data transmitted and/or received by the second communication unit as second communication data and storing in the storage the second communication data associated with a value indicating a time point at which the second communication data is transmitted and/or received, wherein
   each of the first communication data and the second communication data comprises a transmission source address, a reception source address, a type of protocol, and a port number, and
   the first condition and the second condition are defined in accordance with instructions included in the control program and related to the address, the type of protocol, and the port number.

12. The non-transitory computer-readable storage medium according to claim 11, wherein the control program further causes the control device to perform rearranging the first communication data associated with the value indicating the time point and the second communication data associated with the value indicating the time in accordance with the values indicating the time points.

13. The non-transitory computer-readable storage medium according to claim 12, wherein a support device that acquires, from the control device, the first communication data associated with the value indicating the time point and the second communication data associated with the value indicating the time point.

14. The non-transitory computer-readable storage medium according to claim 13, wherein the support device comprises a display unit that displays an image containing a set of the rearranged communication data.

15. The non-transitory computer-readable storage medium according to claim 14, further comprising displaying, at the support device, in a different manner a piece of communication data from among the set of the rearranged communication data that satisfies a condition specified by a user.

* * * * *